(12) United States Patent
Kamioka

(10) Patent No.: US 10,836,040 B2
(45) Date of Patent: Nov. 17, 2020

(54) DESIRED ZMP TRAJECTORY GENERATING DEVICE

(71) Applicant: HONDA MOTOR CO., LTD., Tokyo (JP)

(72) Inventor: Takumi Kamioka, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 335 days.

(21) Appl. No.: 16/111,450

(22) Filed: Aug. 24, 2018

(65) Prior Publication Data
US 2019/0070729 A1 Mar. 7, 2019

(30) Foreign Application Priority Data
Sep. 4, 2017 (JP) .................. 2017-169653

(51) Int. Cl.
*B25J 9/16* (2006.01)
*B62D 57/032* (2006.01)
(Continued)

(52) U.S. Cl.
CPC .......... *B25J 9/1664* (2013.01); *B25J 9/0009* (2013.01); *B25J 9/1671* (2013.01); *B25J 11/0035* (2013.01); *B62D 57/032* (2013.01)

(58) Field of Classification Search
CPC ...... B25J 9/1664; B25J 9/1671; B25J 9/0006; B25J 11/0035; B62D 57/032
See application file for complete search history.

(56) References Cited

U.S. PATENT DOCUMENTS 6,876,903 B2    4/2005   Takenaka
7,308,335 B2 *  12/2007  Takenaka ............... B62D 57/02
                                                        318/568.1
(Continued)

FOREIGN PATENT DOCUMENTS

JP     3726081      9/2005
JP     2017-030123  2/2017

OTHER PUBLICATIONS

S. Kajita, T. Nagasaki, K. Kaneko and H. Hirukawa, "ZMP-Based Biped Running Control," in IEEE Robotics & Automation Magazine, vol. 14, No. 2, pp. 63-72, Jun. 2007, doi: 10.1109/MRA.2007.380655. (Year: 2007).*

(Continued)

*Primary Examiner* — Nicholas Kiswanto
(74) *Attorney, Agent, or Firm* — Rankin, Hill & Clark LLP

(57) ABSTRACT

The control device 41 includes a desired variable value determining unit (52a) which determines desired values of unknown variables composed of coefficients in respective terms of a polynomial function expressing a desired ZMP trajectory and a landing position correction amount for correcting a desired landing position of a leg from a reference desired landing position. The desired variable value determining unit (52a) uses an evaluation function having the coefficients in the polynomial function and the landing position correction amount as unknown variables, and a plurality of constraint conditions each configured by a linear equality or linear inequality regarding the unknown variables, to determine desired values of the unknown variables, by a solution method for a quadratic programming problem, in such a way as to minimize the value of the evaluation function.

6 Claims, 9 Drawing Sheets

(51) Int. Cl.
    *B25J 11/00*       (2006.01)
    *B25J 9/00*        (2006.01)

(56) References Cited

U.S. PATENT DOCUMENTS

| | | | |
|---|---|---|---|
| 7,319,919 B2 * | 1/2008 | Takenaka | B25J 13/085 |
| | | | 180/8.1 |
| 8,204,626 B2 * | 6/2012 | Yoshiike | B62D 57/032 |
| | | | 700/260 |
| 8,855,820 B2 * | 10/2014 | Watabe | G05D 3/12 |
| | | | 700/253 |
| 9,533,415 B2 * | 1/2017 | Kamioka | B25J 9/1633 |
| 9,957,003 B2 * | 5/2018 | Kamioka | B62D 57/032 |
| 10,589,810 B2 * | 3/2020 | Uemura | B25J 5/00 |
| 2017/0036346 A1 | 2/2017 | Kamioka | |
| 2020/0008712 A1 * | 1/2020 | Takenaka | A61B 5/486 |

OTHER PUBLICATIONS

T. Takenaka, T. Matsumoto and T. Yoshiike, "Real time motion generation and control for biped robot—1st report: Walking gait pattern generation-," 2009 IEEE/RSJ International Conference on Intelligent Robots and Systems, St. Louis, MO, 2009, pp. 1084-1091, doi: 10.1109/IROS.2009.5354662. (Year: 2009).*

Bruijn, Sjoerd M, and Jaap H van Dieën. "Control of human gait stability through foot placement." Journal of the Royal Society, Interface vol. 15,143 (2018): 20170816. doi:10.1098/rsif.2017.0816 (Year: 2017).*

* cited by examiner

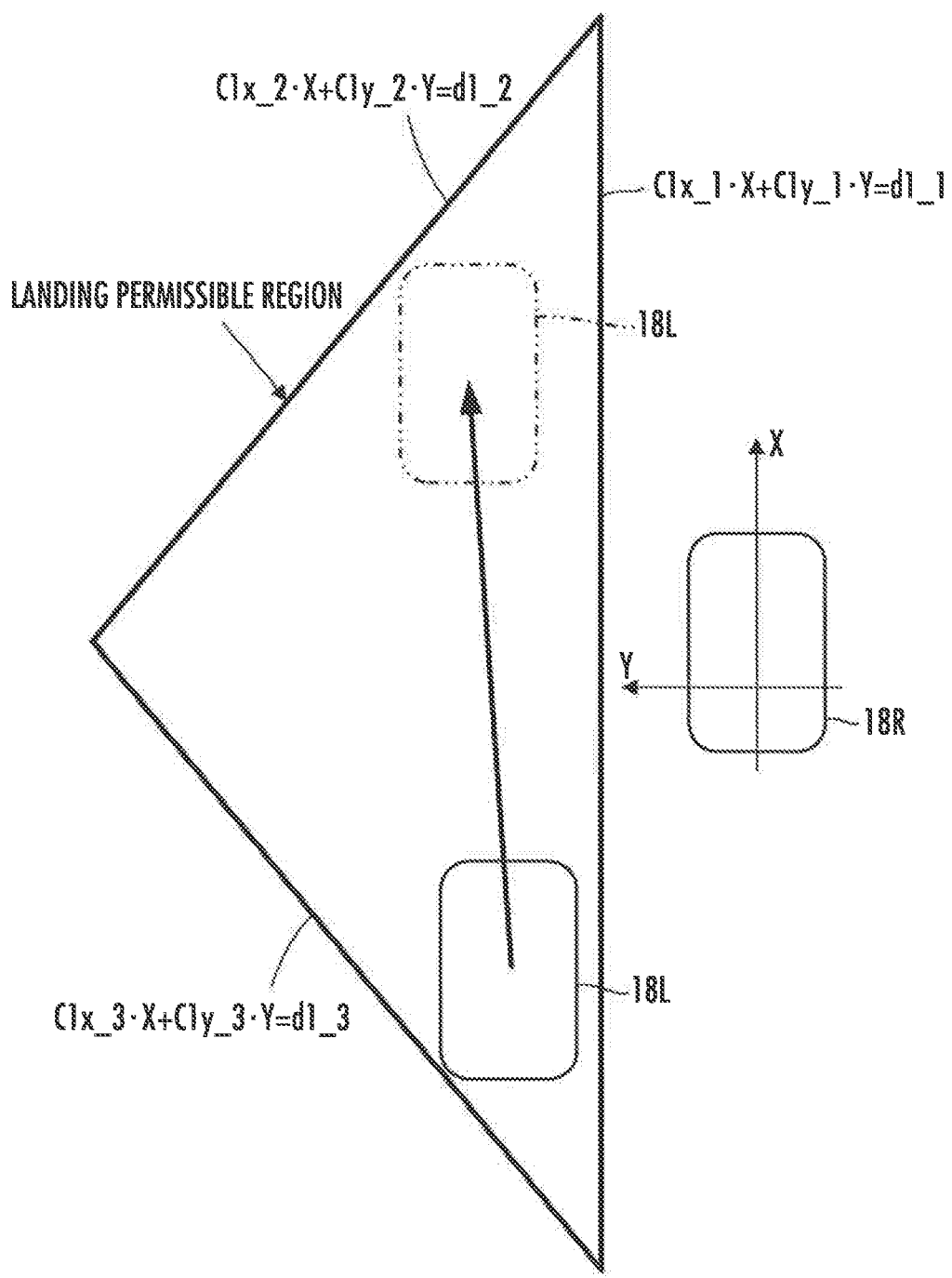

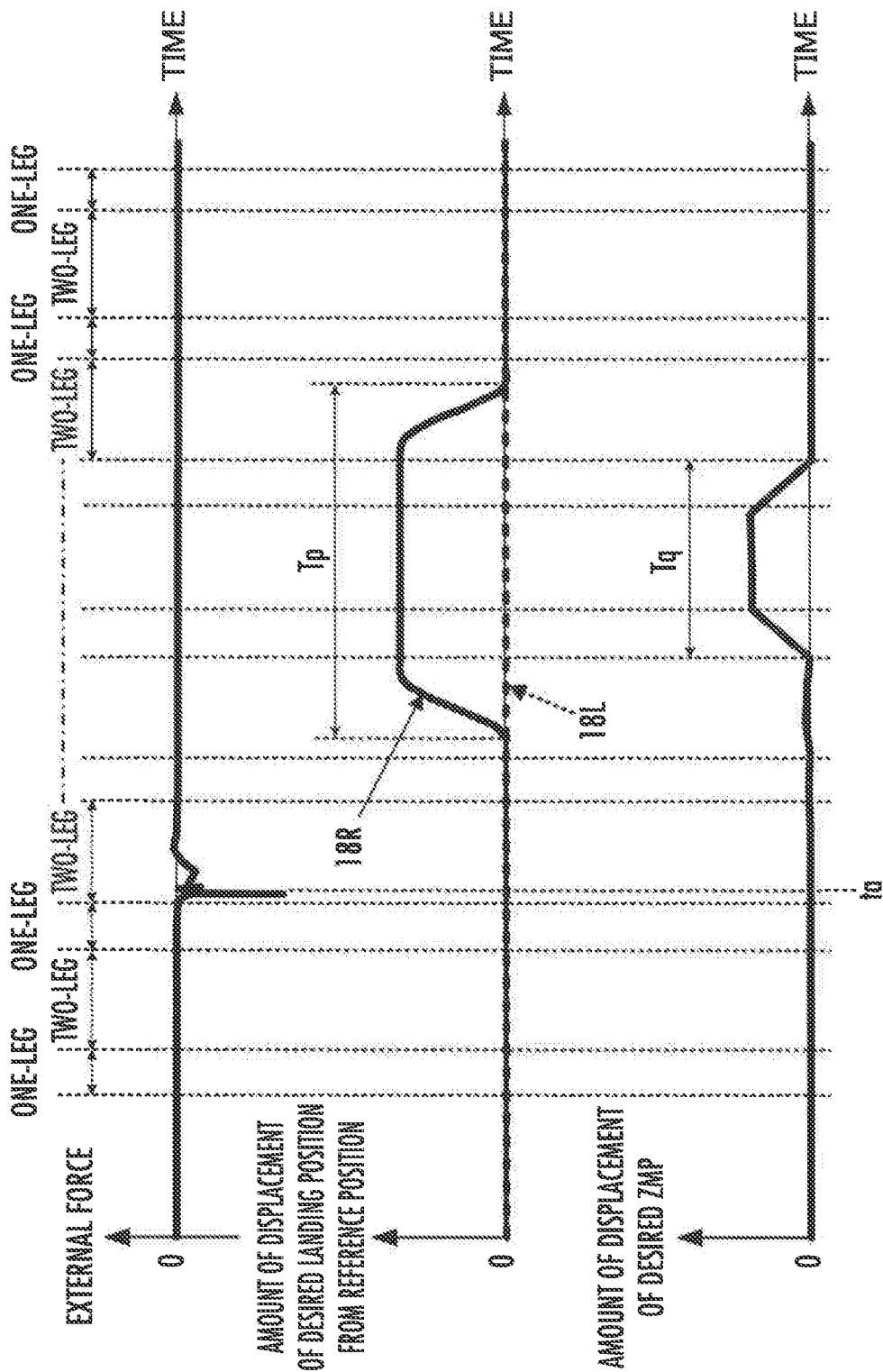

DESIRED ZMP TRAJECTORY GENERATING DEVICE

BACKGROUND OF THE INVENTION

Field of the Invention

The present invention relates to a device for generating a desired ZMP trajectory for a legged mobile robot.

Description of the Related Art

In the case of controlling movement of a mobile robot, it is conventionally a common practice to generate a trajectory of a desired position (on a time axis) of a zero moment point (ZMP), or, a desired ZMP trajectory, and to generate a desired gait defining an operational target of each joint of the robot so as to fulfill the desired ZMP trajectory (see, for example, Japanese Patent No. 3726081 or U.S. Pat. No. 6,876,903).

Further, a technique of generating a desired ZMP trajectory has been proposed in, for example, Japanese Patent Application Laid-Open No. 2017-30123 or US Patent Application Laid-Open No. 2017/0036346. In the technique found in these documents, a desired ZMP trajectory is expressed by a polynomial function, and a plurality of constraint conditions regarding the desired ZMP trajectory are expressed by linear equalities or linear inequalities regarding the coefficients of the polynomial function.

Then, processing of determining values of the coefficients of the polynomial function, under the plurality of constraint conditions, in such a way as to minimize an evaluation function (cost function) regarding the coefficients of the polynomial function is carried out by an algorithm of a solution method for a quadratic programming problem, whereby the desired ZMP trajectory is determined.

SUMMARY OF THE INVENTION

In the conventional technique found in Japanese Patent Application Laid-Open No. 2017-30123 or US Patent Application Laid-Open No. 2017/0036346, a desired ZMP trajectory is generated by setting in advance desired landing positions of the respective legs of the mobile robot. However, this means that, if the desired landing positions are inappropriate, it may not be possible to generate a desired ZMP trajectory fulfilling the plurality of constraint conditions.

On such an occasion, it was conventionally necessary to reset the desired landing positions of the legs of the mobile robot to generate a desired ZMP trajectory again. Further, in such a case, it would be difficult to determine how to correct the desired landing positions of the legs, often requiring repetition of trial and error of correcting the desired landing positions of the legs. Thus, conventionally, the processing of generating a desired ZMP trajectory often took a long time.

In view of the foregoing, it is an object of the present invention to provide a device that is capable of efficiently performing processing of generating a desired ZMP trajectory to fulfill a plurality of constraint conditions, along with correcting the desired landing position of the legged mobile robot.

To achieve the above object, the desired ZMP trajectory generating device according to the present invention is a device for generating a desired ZMP trajectory as a trajectory of a desired position of a zero moment point (ZMP) of a legged mobile robot, the device including:

a landing goal setting unit which sets a reference desired landing position and a reference desired landing posture of each leg at a time of movement of the legged mobile robot in a trajectory generation object period for which a desired ZMP trajectory is to be generated, and a desired variable value determining unit which determines desired values for a plurality of unknown variables, the unknown variables comprising coefficients in respective terms of a polynomial function of degree 2 or higher configured to express the desired ZMP trajectory in the trajectory generation object period as a function of time, and a landing position correction amount as a correction amount for correcting at least one desired landing position in the trajectory generation object period from the reference desired landing position, or a parameter having a certain relationship with the landing position correction amount; wherein the desired variable value determining unit is configured to use an evaluation function, having the coefficients in the respective terms of the polynomial function and the landing position correction amount or the parameter as unknown variables, and a plurality of constraint conditions each configured by a linear equality or linear inequality regarding the coefficients in the respective terms of the polynomial function and the landing position correction amount, to determine desired values of the unknown variables, by a solution method for a quadratic programming problem, in such a way as to minimize a value of the evaluation function while fulfilling the constraint conditions (first aspect of the invention).

Here, a desired ZMP trajectory for a legged mobile robot (hereinafter, sometimes simply referred to as "robot") is affected by the landing positions of the respective legs at the time of movement of the robot. The present inventors have found through various studies that, in the case of expressing a desired ZMP trajectory using a polynomial function of degree 2 or higher, various kinds of constraint conditions regarding the desired ZMP trajectory (constraint conditions that the desired ZMP trajectory should fulfill) may each be expressed by a linear equality or linear inequality in the form including coefficients in respective terms of the polynomial function as well as a landing position correction amount (from a given reference landing position) of each leg or a parameter having a certain relationship with the landing position correction amount.

For the parameter described above, a parameter having a linear relationship with the landing position correction amount, for example, may be adopted.

Accordingly, as a technique capable of handling the coefficients in the respective terms of the polynomial function and the landing position correction amount of each leg or the parameter as a plurality of unknown variables and collectively determining these unknown variables, a solution method for a quadratic programming problem can be used. Thus, in the present invention, the desired ZMP trajectory generating device has been configured as in the first aspect of the invention described above.

According to the first aspect of the invention, with the use of the solution method for a quadratic programming problem, the whole of desired values of the plurality of unknown variables, composed of the coefficients in the respective terms of the polynomial function expressing the desired ZMP trajectory in the trajectory generation object period and the landing position correction amount used for correcting at least one desired landing position in the trajectory generation object period from the reference desired landing position or the parameter having a certain relationship with that landing position correction amount, can be determined collectively to fulfill the plurality of constraint conditions.

Accordingly, in the trajectory generation object period, generating a desired ZMP trajectory that may fulfill the plurality of constraint conditions and determining a landing position correction amount for correcting at least one desired landing position from the reference desired landing position can be performed collectively.

Therefore, according to the first aspect of the invention, the processing of generating a desired ZMP trajectory to fulfill the constraint conditions can be performed efficiently along with correcting the desired landing position of the legged mobile robot.

In the first aspect of the invention, the constraint conditions may include a linear inequality which expresses a first constraint condition that a desired position of the ZMP at at least one sampling time in the trajectory generation object period exists within a region of a supporting polygon which is obtained by displacing a reference supporting polygon, determined based on the reference desired landing position and the reference desired landing posture in the trajectory generation object period, by a displacement amount defined in accordance with the landing position correction amount or the parameter (second aspect of the invention).

With this configuration, the first constraint condition regarding the positional relationship between the desired ZMP and the supporting polygon is expressed by a linear inequality reflecting the landing position correction amount. It is hence possible to perform generating a desired ZMP trajectory fulfilling the first constraint condition efficiently along with correcting the desired landing position by using a solution method for a quadratic programming problem.

In the second aspect of the invention, it is preferable that the legged mobile robot is a robot that has two legs and travels in such a manner that a two-leg supporting period in which the two legs are in contact with a floor and a one-leg supporting period in which only one of the two legs is in contact with the floor are alternated repeatedly, and that the desired variable value determining unit is configured such that, when the sampling time includes a time in the two-leg supporting period included in the trajectory generation object period, the unit sets a reference supporting polygon, determined based on a desired landing position and a desired landing posture of a first leg that is in contact with the floor in the one-leg supporting period immediately before the two-leg supporting period and the reference desired landing position and the reference desired landing posture of a second leg that lands on the floor at an end of the immediately preceding one-leg supporting period, as a supporting polygon at a start of the two-leg supporting period, sets a supporting polygon obtained by translating the reference supporting polygon by a landing position correction amount of the second leg, as a supporting polygon at an end of the two-leg supporting period, and sets a supporting polygon corresponding to the desired ZMP at the sampling time in the two-leg supporting period, as a supporting polygon obtained by translating the reference supporting polygon at the start of the two-leg supporting period by a displacement amount obtained by dividing the landing position correction amount of the second leg in accordance with a ratio of a time difference between the start of the two-leg supporting period and the sampling time with respect to a time width of the two-leg supporting period (third aspect of the invention).

It should be noted that in the third aspect of the invention, the desired landing position and the desired landing posture of the first leg that is in contact with the floor in the one-leg supporting period immediately before the two-leg supporting period mean the desired landing position and the desired landing posture already determined for the first leg. In this case, the determined desired landing position means a reference desired landing position for the first leg, or a desired landing position obtained by correcting the reference desired landing position by the landing position correction amount already determined for the first leg. Further, the determined desired landing posture means a reference desired landing posture for the first leg.

Accordingly, it becomes possible to easily and appropriately set a linear inequality expressing the first constraint condition at a given sampling time in the two-leg supporting period.

In the first through third aspects of the invention, the constraint conditions may include a linear equality which expresses a second constraint condition that is a condition for keeping in a stable state an inverted pendulum mass point in a model that expresses a motion of a center of gravity of the legged mobile robot by a motion of the inverted pendulum mass point having a mass point at the center of gravity of the robot and having a ZMP on the desired ZMP trajectory as a fulcrum, the second constraint condition being a condition that a motional state of the inverted pendulum mass point at a prescribed time in the trajectory generation object period agrees with a prescribed motional state. In this case, the motional state of the inverted pendulum mass point at the prescribed time is preferably a motional state which is expressed as a total of a component defined in accordance with the reference desired landing position and the reference desired landing posture prior to the prescribed time and a component defined in accordance with the landing position correction amount or the parameter regarding the reference desired landing position prior to the prescribed time (fourth aspect of the invention).

With this configuration, a linear equality expressing the second constraint condition can be set appropriately. Thus, the processing of generating a desired ZMP trajectory fulfilling the second constraint condition by using a solution method for a quadratic programming problem can be performed efficiently along with correcting the desired landing position.

It should be noted that as the motional state of the inverted pendulum mass point in the fourth aspect of the invention, a motional state expressed by a linear combination of the position and moving velocity of the inverted pendulum mass point, for example, can be adopted.

In the first through fourth aspects of the invention, the constraint conditions may include a linear equality which expresses a third constraint condition that a desired position of the ZMP at a prescribed time in the trajectory generation object period agrees with a prescribed position within a floor-contacting surface of a leg that is in contact with the floor at the prescribed time. In this case, the prescribed position is preferably a position which is set as a position displaced from a position determined in accordance with the reference desired landing position and the reference desired landing posture of the leg that is in contact with the floor at the prescribed time by the landing position correction amount with respect to the reference desired landing position (fifth aspect of the invention).

With this configuration, a linear equality expressing the third constraint condition can be set appropriately. Thus, the processing of generating a desired ZMP trajectory fulfilling the third constraint condition by using a solution method for a quadratic programming problem can be performed efficiently along with correcting the desired landing position.

In the first through fifth aspects of the invention, it is preferable that the evaluation function is an evaluation function which is set as a function summing up a function expressing an integral of a square value of a moving acceleration of the ZMP in the desired ZMP trajectory using the coefficients in the respective terms of the polynomial function, a function expressing an L2 norm of the landing position correction amount using the landing position correction amount or the parameter, and a function expressing an L1 norm of the landing position correction amount using the landing position correction amount or the parameter (sixth aspect of the invention).

With this configuration, the desired values of the unknown variables, comprising the coefficients in respective terms of the polynomial function expressing the desired ZMP trajectory and the landing position correction amount or the parameter, are determined, by a solution method for a quadratic programming problem, so as to make as small as possible the integral of the square value of the moving acceleration of the ZMP and also to make as small as possible the L2 norm and L1 norm of the landing position correction amount.

It is thus possible to generate a desired ZMP trajectory in such a way as to avoid generation of the desired ZMP trajectory in the form causing an abrupt change of the moving velocity of the ZMP in the desired ZMP trajectory and to make the landing position correction amount as small as possible (so as to prevent deviation of the landing position of each leg from the reference landing position as much as possible). Consequently, a desired gait ensuring smooth movement of the robot can be generated.

BRIEF DESCRIPTION OF THE DRAWINGS

FIG. 8 is an illustration related to a geometric condition as a constraint condition; and FIG. 9 is a graph showing, by way of example, external force, an amount of displacement of the desired landing position/posture from the reference position, and an amount of displacement of the desired ZMP in the embodiment.

DESCRIPTION OF THE PREFERRED EMBODIMENTS

Figure 1:
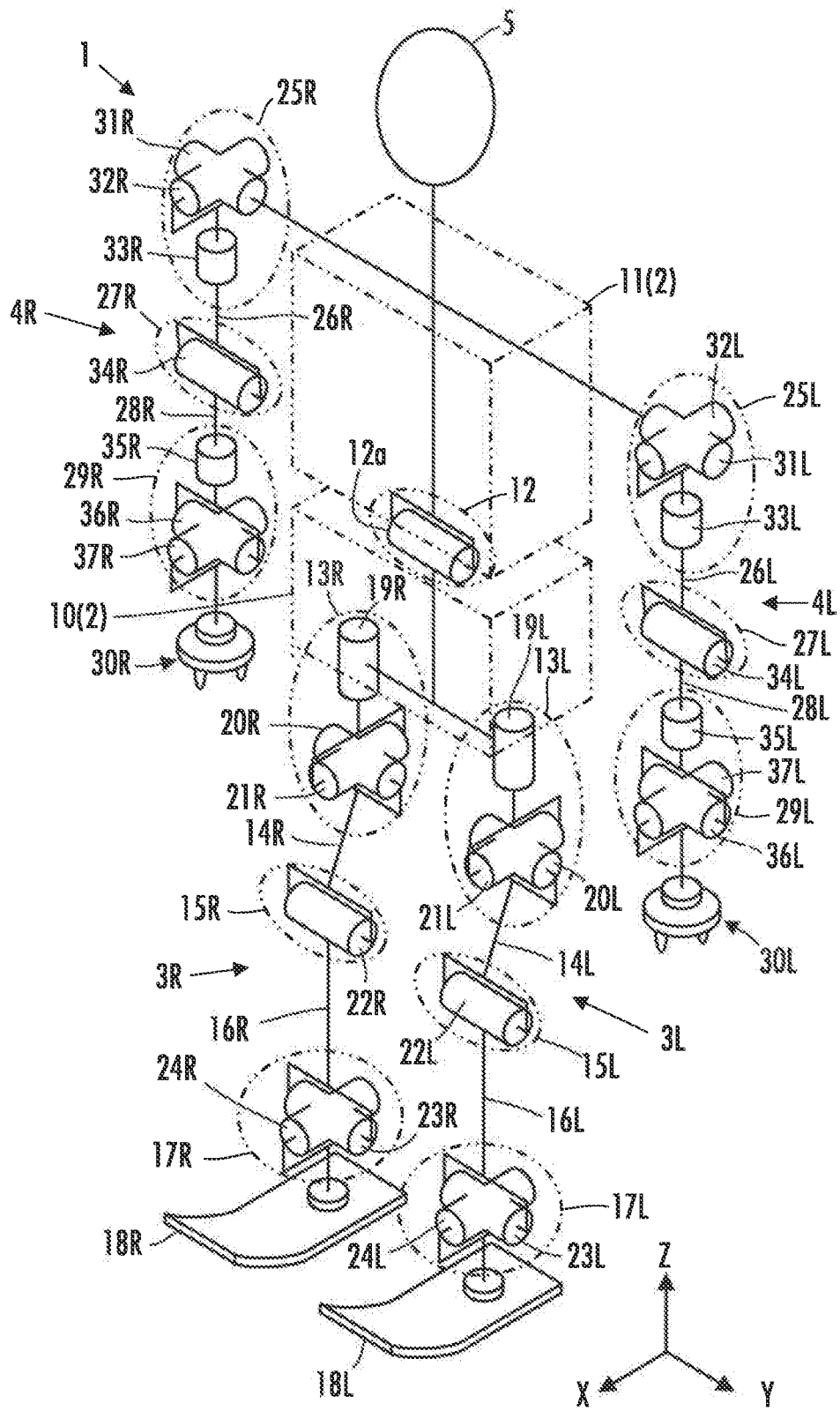
FIG. 1 shows a configuration of a legged mobile robot in an embodiment of the present invention.

An embodiment of the present invention will be described below with reference to FIGS. 1 to 9. FIG. 1 schematically shows the general configuration of a legged mobile robot given as an example in the present embodiment. This legged mobile robot 1 (hereinafter, simply referred to as "robot 1") is a humanoid, legged mobile robot which has a body 2, a plurality of (in the present embodiment, four) movable link mechanisms 3R 3L, 4R, and 4L extended from the body 2, and a head 5.

Of the four movable link mechanisms 3R, 3L, 4R, and 4L, the movable link mechanisms 3R and 3L are link mechanisms corresponding to a pair of right and left leg link mechanisms, and the movable link mechanisms 4R and 4L are link mechanisms corresponding to a pair of right and left arm link mechanisms.

It should be noted that "R" and "L" included in the reference characters shown in the figure indicate the constituent elements on the right side and on the left side, respectively, of the robot 1. In the following description, however, the symbols "R" and "L" will be omitted when it is unnecessary to distinguish between the right and the left. Further, the movable link mechanisms 3R and 3L may be referred to as the leg link mechanisms 3R and 3L (or as the leg link mechanisms 3), and the movable link mechanisms 4R and 4L may be referred to as the arm link mechanisms 4R and 4L (or as the arm link mechanisms 4).

Further, in the following description of the present embodiment, the yaw, pitch, and roll directions mean directions about an axis in an up/down direction (Z axis in FIG. 1), an axis in a right/left direction (Y axis in FIG. 1), and an axis in a front/back direction (X axis in FIG. 1), respectively, of the robot 1 in the state where the robot 1 is standing in an upright posture as shown in FIG. 1 (in the state where the body 2 and the movable link mechanisms 3R, 3L, 4R, and 4L extend approximately in the up/down direction). The X, Y, and Z axes shown in FIG. 1 are the coordinate axes of a three-axis orthogonal coordinate system.

The body 2 is a link mechanism corresponding to the upper body of the robot 1. In the present embodiment, the body 2 is composed of two element links of a lower body 10 and an upper body 11 arranged above the lower body 10, and a joint mechanism 12 joining the lower body 10 and the upper body 11. In the robot 1 illustrated, the joint mechanism 12 is configured with a joint 12a having a degree of freedom of rotation in the pitch direction (about the Y axis), for example.

Of the movable link mechanisms 3R, 3L, 4R, and 4L, the leg link mechanisms 3R and 3L share the same construction. More specifically, each leg link mechanism 3 includes the following element links as its constituent elements: a thigh 14 which is joined to the lower body 10 through the intermediary of a hip joint mechanism 13, a crus 16 which is joined to the thigh 14 through the intermediary of a knee joint mechanism 15, and a foot 18 which is joined to the crus 16 through the intermediary of an ankle joint mechanism 17. The foot 18 is an element link constituting the distal portion of the leg link mechanism 3.

In the robot 1 illustrated, the hip joint mechanism 13 is made up of three joints 19, 20, and 21 having degrees of freedom of rotation in the yaw direction (about the Z axis), the pitch direction (about the Y axis), and the roll direction (about the X axis), respectively. The knee joint mechanism 15 is made up of a joint 22 having a degree of freedom of rotation in the pitch direction. The ankle joint mechanism 17 is made up of two joints 23 and 24 having degrees of freedom of rotation in the pitch direction and the roll direction, respectively.

Therefore, in the present embodiment, each leg link mechanism 3 is configured such that its distal portion (foot 18) has six degrees of freedom of motion with respect to the lower body 10.

Of the movable link mechanisms 3R, 3L, 4R, and 4L, the arm link mechanisms 4R and 4L share the same construction. More specifically, each arm link mechanism 4 includes the following element links as its constituent elements: an upper arm 26 which is joined to the upper body 11 through the intermediary of a shoulder joint mechanism 25, a forearm 28 which is joined to the upper arm 26 through the intermediary of an elbow joint mechanism 27, and a hand 30 which is joined to the forearm 28 through the intermediary of a wrist joint mechanism 29. The hand 30 is an element link constituting the distal portion of the arm link mechanism 4.

In the robot 1 illustrated, the shoulder joint mechanism 25 is made up of three joints 31, 32, and 33 having degrees of freedom of rotation in the pitch, roll, and yaw directions, respectively. The elbow joint mechanism 27 is made up of a joint 34 having a degree of freedom of rotation in the pitch (or roll) direction. The wrist joint mechanism 29 is made up of three joints 35, 36, and 37 having degrees of freedom of rotation in the yaw, pitch, and roll directions, respectively.

Therefore, in the present embodiment, each arm link mechanism 4 is configured such that its distal portion (hand 30) has seven degrees of freedom of motion with respect to the upper body 11.

It should be noted that the hand 30 may include an open/close mechanism for a work by the hand 30, or a plurality of bendable and stretchable finger mechanisms.

The head 5 is arranged on top of, and fixedly secured to, the upper body 11. The head 5, however, may be joined to the upper body 11 through the intermediary of a joint mechanism so that it can perform a tilting or panning operation, for example.

The above has outlined the mechanical structure of the robot 1 of the present embodiment. The robot 1 with such a structure can travel basically through operations of the right and left leg link mechanisms 3R and 3L serving as two legs (through the operation in biped gait in which the feet 18 each move in the air and then come into contact with the floor repeatedly).

Alternatively, the arm link mechanisms 4R, 4L can be operated as leg link mechanisms besides the leg link mechanisms 3R, 3L for traveling of the robot 1. For example, the robot 1 can also travel through the operation in quadruped gait in which the distal portions (feet 18 and hands 30) of the four movable link mechanisms of leg link mechanisms 3R 3L and arm link mechanisms 4R, 4L each move in the air and then come into contact with the floor repeatedly.

Supplementally, each leg link mechanism 3 may be configured to have more than six degrees of freedom of motion, for example. Further, each arm link mechanism 4 may be configured to have less than seven degrees of freedom of motion, or more than seven degrees of freedom of motion, for example.

Further, the joint mechanism 12 of the body 2 may be configured with a joint having a degree of freedom of rotation in the roll or yaw direction. Alternatively, the joint mechanism 12 may be configured to have more than one degree of freedom of motion. Still alternatively, the body 2 may be configured as one piece (with the lower body 10 and the upper body 11 integrated), without the joint mechanism 12.

The joints in each leg link mechanism 3 and each arm link mechanism 4 are not limited to the rotary joints; they may include prismatic joints.

The robot 1 may have a structure including no head 5, or a structure including only one or neither one of the arm link mechanisms 4R, 4L.

Further, the robot 1 may have three or more leg link mechanisms. In the case where the arm link mechanisms 4R, 4L are operated as the leg link mechanisms in addition to the leg link mechanisms 3R, 3L for traveling of the robot 1, the robot 1 may be considered as a robot which has essentially four leg link mechanisms.

Figure 2:
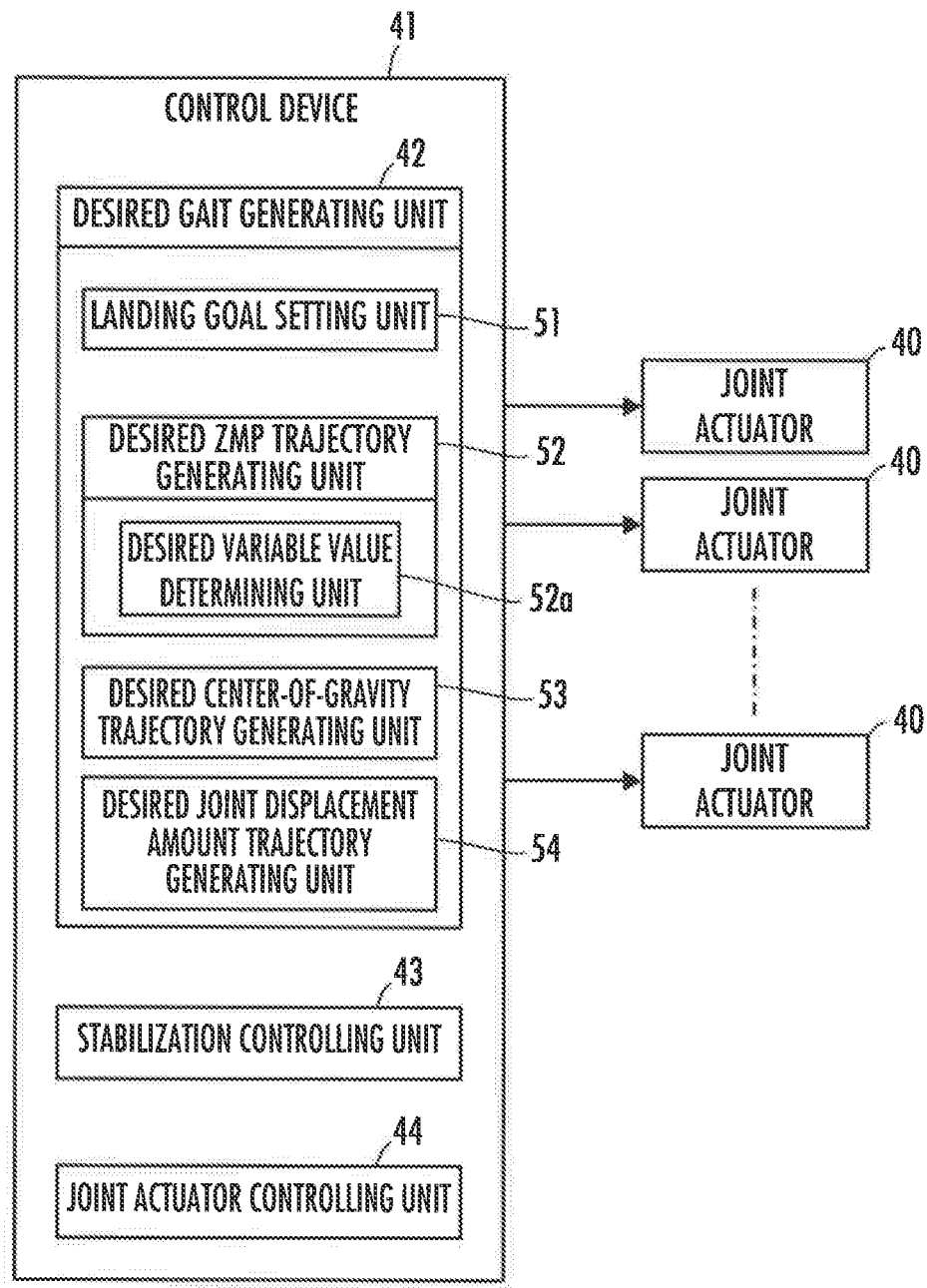
FIG. 2 is a block diagram showing the functions of a control device of the legged mobile robot.

Although not shown in FIG. 1, the robot 1 includes, as shown in FIG. 2, joint actuators 40 which rotatively drive the corresponding ones of the above-described joints, and a control device 41 which performs operation control of the robot 1.

The joint actuator 40, provided for each joint, is made up of an electric motor or a hydraulic actuator, for example. In this case, the drive mechanism of each joint by the joint actuator 40 may have a construction known in the art. Further, the joint actuator 40 is not limited to the rotary actuator; it may be a linear actuator.

The control device 41 is an electronic circuit unit including a CPU, RAM, ROM, interface circuit, and so on. The control device 41 includes, as major functions implemented by installed programs and hardware configuration, a desired gait generating unit 42 which generates a desired gait (operational goal for the robot 1) as a controlling desired value for the operation control of each joint of the robot 1, a stabilization controlling unit 43 which corrects the desired gait as appropriate for stabilization of the actual posture of the robot 1, and a joint actuator controlling unit 44 which controls each joint actuator 40 of the robot 1 in accordance with the desired gait corrected by the stabilization controlling unit 43.

The desired gait generating unit 42 includes: a landing goal setting unit 51 which, for each moving/landing portion as a site (foot 18 or hand 30) caused to move in the air and then land on (or come into contact with) the floor during the traveling of the robot 1, sets goals of its position and posture (hereinafter, referred to as "desired landing position/posture") at a planned landing location and a goal of its landing time (hereinafter, referred to as "desired landing time") at that planned landing location; a desired ZMP trajectory generating unit 52 which generates a desired ZMP trajectory as a trajectory of a desired position of the zero moment point (ZMP) (hereinafter, this position may be referred to as "desired ZMP") and also determines a landing position correction amount for correcting the desired landing position out of the aforesaid desired landing position/posture; a desired center-of-gravity trajectory generating unit 53 which generates a desired center-of-gravity trajectory as a trajectory of a desired position of the overall center of gravity of the robot 1; and a desired joint displacement amount trajectory generating unit 54 which generates a trajectory of a desired joint displacement amount as a desired value of the displacement amount (in the present embodiment, rotational angle) of each joint of the robot 1.

To give supplemental explanation about the terms used herein, the "position" of a given site, such as a foot 18, of the robot 1 means the spatial position of a representative point of the site (point fixed with respect to the site), and the "posture" of a given site means the spatial orientation of the site.

Further, the "position/posture" means a set of "position" and "posture". The "desired position/posture" means a set of "desired position" and "desired posture". Further, the "trajectory" means one which is expressed as a time series of instantaneous values, or as a function of time.

It should be noted that the "position" and "posture" of a given site of the robot 1 are described as the position and posture observed in a global coordinate system (world coordinate system) which is arbitrarily designed and set with respect to the operating environment of the robot 1.

Further, the ZMP is a point on a floor surface at which a component in a horizontal direction (component about a horizontal axis) of a moment generated about the ZMP due to the resultant force of the gravitational force acting on the robot 1 and the inertial force generated by the motion of the entire robot 1 becomes zero. It should be noted that the "floor surface" is not limited to the floor surfaces (indoors) in the normal meaning; it also includes any contact surfaces, including the ground and road surfaces, with which the moving/landing portion may be brought into contact.

Specific processing performed by the control device 41 will now be described, by giving as an example the case where the robot 1 moves in a biped gait operation in which the feet 18 of the leg link mechanisms 3R and 3L each move in the air and then land on the floor repeatedly.

The biped gait is a gait for the robot 1 to travel by moving the feet 18R and 18L of the leg link mechanisms 3R and 3L serving as two legs, in a manner similar to that in the human walking operation. More specifically, the biped gait is a gait in which a one-leg supporting period and a two-leg supporting period are repeated alternately. In the one-leg supporting period, with a foot 18 of one of the leg link mechanisms 3R, 3L (as a supporting leg) being in contact with the floor (in the state of receiving contact reaction force from the floor surface), the foot 18 of the other leg link mechanism (as a free leg) moves in the air and then lands on the floor. In the two-leg supporting period, the feet 18R, 18L of both leg link mechanisms 3R, 3L are in contact with the floor. In this case, the leg link mechanism as a supporting leg and the leg link mechanism as a free leg in the one-leg supporting period are changed alternately between the right leg link mechanism 3R and the left leg link mechanism 3L each time the one-leg supporting period is repeated. The feet 18R and 18L each correspond to the aforesaid moving/landing portion.

In the following description, as a global coordinate system for describing the position and posture of a given site, such as a foot 18, of the robot 1 or for describing the position of the ZMP or the center of gravity of the robot 1, a three-axis orthogonal coordinate system having two horizontal axes of X axis and Y axis and a vertical axis of Z axis will be used. In this case, as shown in FIG. 1, the X axis corresponds to the horizontal axis in the longitudinal (front-and-back) directions of the robot 1, and the Y axis corresponds to the horizontal axis in the lateral (right-and-left) directions of the robot 1.

The desired gait generating unit 42 of the control device 41 carries out the processing in the landing goal setting unit 51 before initiation of movement of the robot 1, or at an appropriate timing during the movement (for example, each time the robot 1 moves a prescribed number of steps). The landing goal setting unit 51 sets a desired landing position/posture and a desired landing time for a foot 18 of a leg link mechanism 3 as a free leg, for each step up to the N-th step (where N is an integer not smaller than 2).

The desired landing position/posture set by the landing goal setting unit 51 correspond to the reference desired landing position and the reference desired landing posture in the present invention.

In this case, the landing goal setting unit 51 also sets a period (duration) for each of the two-leg supporting period(s) and the one-leg supporting period(s) (or each switching time between the two-leg and one-leg supporting periods) up to the N-th step.

It should be noted that "one step" means an operation of a foot 18 of a leg link mechanism 3 (3R or 3L) of moving in the air and then landing on the floor.

The desired landing position/posture and the desired landing time, and the periods of the two-leg and one-leg supporting periods are set basically in response to a request about a movement pattern, such as moving route and moving velocity of the robot 1, defined by the movement plan or movement command of the robot 1.

In the present embodiment, the desired landing position out of the desired landing position/posture set by the landing goal setting unit 51 is corrected as appropriate by a landing position correction amount which is determined by the desired ZMP trajectory generating unit 52 as will be described later.

Figure 4:
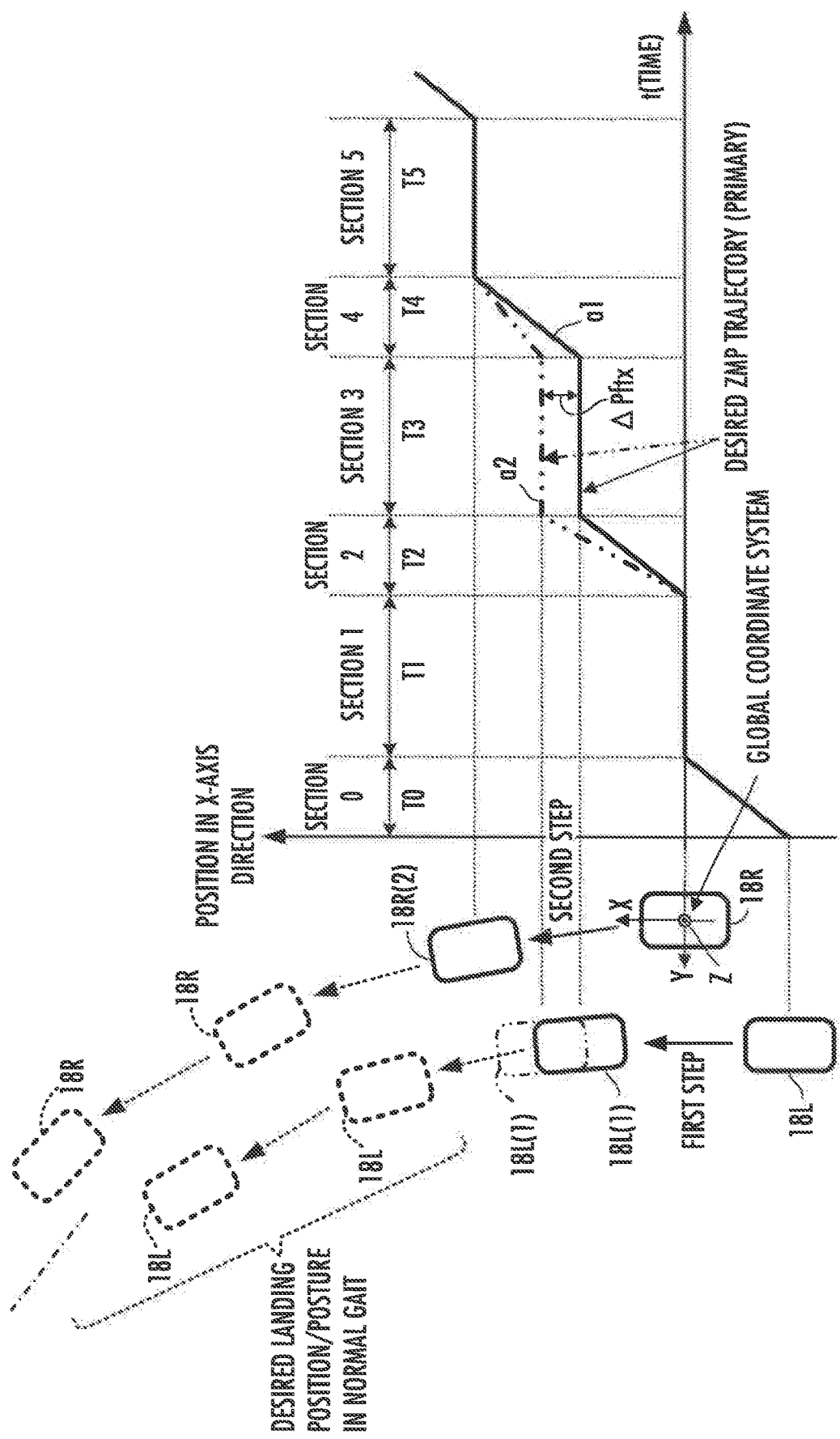
FIG. 4 shows, by way of example, desired landing positions of the feet at the time of movement of the legged mobile robot and corresponding desired ZMP trajectory (in the X-axis direction)

In FIG. 4, the illustration on the left shows, by way of example, the state where desired landing positions/postures (as seen from above) of the feet 18 up to the second step have been set, with the free leg and the supporting leg on the first step being the left leg link mechanism 3L and the right leg link mechanism 3R, respectively, and the free leg and the supporting leg on the second step being the right leg link mechanism 3R and the left leg link mechanism 3L, respectively. In this case, the foot 18L(1) shown by the solid line illustrates the desired landing position/posture of the foot 18L of the free leg for the first step, and the foot 18R(2) shown by the solid line illustrates the desired landing position/posture of the foot 18R of the free leg for the second step.

In the case where the geometry of the floor surface in the operating environment of the robot 1 has been found in advance, the desired landing positions/postures and the desired landing times as well as the periods of the two-leg and one-leg supporting periods set in the landing goal setting unit 51 may be those prepared before the robot 1 starts moving.

In the case where the robot 1 travels while measuring the geometry of the floor surface around the robot 1 using an external field sensor or other equipment mounted on the robot 1, the desired landing positions/postures and the desired landing times as well as the periods of the two-leg and one-leg supporting periods set in the landing goal setting unit 51 may be updated at any time (for example, each time the robot 1 moves one or more steps or at predetermined time intervals).

Next, the desired gait generating unit 42 of the control device 41 carries out, by the desired ZMP trajectory generating unit 52, the processing of generating a desired ZMP trajectory on the basis of the desired landing positions/postures and the desired landing times as well as the periods of the two-leg and one-leg supporting periods set in the landing goal setting unit 51.

Here, in the present embodiment, the desired gait generating unit 42 of the control device 41 generates, for example at each movement by one step of the robot 1, a desired gait (such as a trajectory of desired position/posture of each foot 18) of the robot 1 for a predetermined period of time (including a period for two steps, for example) in the future.

To this end, at each movement by one step of the robot 1, the desired ZMP trajectory generating unit 52 generates a desired ZMP trajectory for the predetermined period of time.

In this processing, the details of which will be described later, the desired ZMP trajectory generating unit 52 generates a desired ZMP trajectory as a trajectory which is expressed by a polynomial function of degree 2 or higher (function of time) under a prescribed constraint condition. In this case, the processing by the desired ZMP trajectory generating unit 52 includes, besides the generation of the desired ZMP trajectory, determining a landing position correction amount which is used for correcting as appropriate the desired landing position out of the desired landing position/posture set in the landing goal setting unit 51.

Next, the desired gait generating unit 42 of the control device 41 carries out, by the desired center-of-gravity trajectory generating unit 53, the processing of generating a desired center-of-gravity trajectory of the robot 1 for a predetermined period of time in the future, using a dynamic model of the robot 1, so as to fulfill the desired ZMP trajectory. In this case, as the dynamic model of the robot 1, an inverted pendulum model for example is used which expresses the motion of the center of gravity of the robot 1 by the motion of an inverted pendulum mass point that swings at a certain height with the desired ZMP as a fulcrum.

The desired center-of-gravity trajectory generating unit 53 calculates a motion acceleration in the horizontal direction of the inverted pendulum mass point, so as to fulfill the desired ZMP (more specifically, such that a component about the horizontal axis of a moment that is generated about the desired ZMP by the resultant force of the inertial force generated by the motion of the inverted pendulum mass point and the gravitational force acting on the inverted pendulum mass point will become zero). Further, the desired center-of-gravity trajectory generating unit 53 calculates, as a desired center-of-gravity trajectory of the robot 1, a trajectory of the horizontal position (in the X-axis and Y'-axis directions) of the inverted pendulum mass point obtained by integrating two times the motion acceleration.

Next, the desired gait generating unit 42 of the control device 41 carries out, by the desired joint displacement amount trajectory generating unit 54, the processing of generating a trajectory of a desired joint displacement amount of each joint of the robot 1 for a predetermined period of time in the future. In this case, the desired joint displacement amount trajectory generating unit 54 generates a trajectory (time series of instantaneous values) of the desired joint displacement amount using, for example, a resolved momentum control method.

With this resolved momentum control method, the desired joint displacement amount trajectory generating unit 54 sets a trajectory of desired translational momentum of the entire robot 1 (=desired translational momentum of the center of gravity) in accordance with the desired center-of-gravity trajectory of the robot 1. Further, the desired joint displacement amount trajectory generating unit 54 sets a trajectory of overall desired angular momentum about the center of gravity of the robot 1 (or about the desired ZMP), as appropriate.

The desired joint displacement amount trajectory generating unit 54 also generates a desired position/posture trajectory of each foot 18 as the moving/landing portion, on the basis of the desired landing position/posture obtained by correcting the desired landing position/posture set in the landing goal setting unit 51 by the landing position correction amount determined in the desired ZMP trajectory generating unit 52, and of the desired landing time and the periods of the two-leg and one-leg supporting periods set in the landing goal setting unit 51.

Further, the desired joint displacement amount trajectory generating unit 54 sets a trajectory of desired position/posture of each of the hands 30R, 30L, as the distal portions of the respective arm link mechanisms 4R, 4L, as appropriate.

It should be noted that the desired angular momentum and the trajectory of desired position/posture of each hand 30R, 30L may be designed and set arbitrarily.

Then, the desired joint displacement amount trajectory generating unit 54, on the basis of the trajectory of desired translational momentum, the trajectory of desired angular momentum, the trajectory of desired position/posture of each foot 18R, 18L, and the trajectory of desired position/posture of each hand 30R, 30L, calculates a trajectory (time series of instantaneous values for each prescribed control processing cycle) of desired joint displacement amount of each joint that may implement the desired translational momentum and the desired angular momentum, by the resolved momentum control method.

It should be noted that the method of generating a trajectory of desired joint displacement amount by using a desired ZMP trajectory is not limited to the above-described method; various known techniques may be adopted.

In the above-described manner, in the present embodiment, the desired gait generating unit 42 of the robot 1 generates a trajectory of desired joint displacement amount of each joint in the future.

Further, the control device 41 carries out the processing of the stabilization controlling unit 43 to correct as appropriate the trajectory of desired joint displacement amount generated in the desired gait generating unit 42. In this case, the stabilization controlling unit 43 determines a correction amount of desired position/posture of a foot 18 of a leg link mechanism 3 as the supporting leg of the robot 1 (specifically, one foot 18R or 18L of the supporting leg in the one-leg supporting period, or both feet 18R, 18L in the two-leg supporting period), on the basis of, for example, a deviation of a detected value of the actual inclination amount (inclination angle with respect to the vertical direction) of the lower body 10 of the robot 1, detected by an inclination sensor (not shown) mounted on the lower body 10, from an inclination amount defined by the desired posture of the lower body 10, generated in the desired gait generating unit 42, so as to make the deviation approach zero. Then, in accordance with the correction amount, the stabilization controlling unit 43 corrects the desired joint displacement amount of the leg link mechanism 3 as the supporting leg of the robot 1.

The control device 41 then carries out, by the joint actuator controlling unit 44, the processing of controlling the displacement amount of each joint of the robot 1 in accordance with the trajectory of the desired joint displacement amount corrected by the stabilization controlling unit 43.

In this case, the joint actuator controlling unit 44 performs feedback control of the joint actuators 40 in such a way as to cause the actual displacement amount (rotational angle) of each joint, detected by a corresponding displacement amount sensor (not shown) made up of a rotary encoder or the like, to track the desired joint displacement amount of that joint (or the corrected desired joint displacement amount thereof if it has undergone correction by the stabilization controlling unit 43).

It should be noted that, in this case, the desired joint displacement amount at each prescribed control processing cycle may be corrected as appropriate by compliance control, for example, from the desired value generated in the desired joint displacement amount trajectory generating unit 54 (or from the desired value corrected by the stabilization controlling unit 43).

Supplementally, the processing of generating a desired gait (such as a trajectory of desired joint displacement amount) of the robot 1 may be carried out at each movement by one step or a plurality of steps of the robot 1, or at a time interval shorter than the period of one step. Further, at each timing of carrying out the processing of generating a desired gait (such as a trajectory of desired joint displacement amount) of the robot 1, a desired gait for a period shorter than the period up to the second step (for example, a period up to the first step) may be generated, or a desired gait for a period longer than the period up to the second step (for example, a period up to the third step) may be generated.

The processing performed by the desired ZMP trajectory generating unit 52, mentioned above briefly, will now be described in detail. The desired ZMP trajectory generating unit 52 provides the control device 41 with the function as an example of the desired ZMP trajectory generating device of the present invention. The desired ZMP trajectory generating unit 52 includes the function as a desired variable value determining unit 52a which determines values of a plurality of unknown variables composed of coefficients in respective terms of a polynomial function expressing the desired ZMP trajectory, and a variable expressing a landing position correction amount for correcting a desired landing position.

Figure 3:
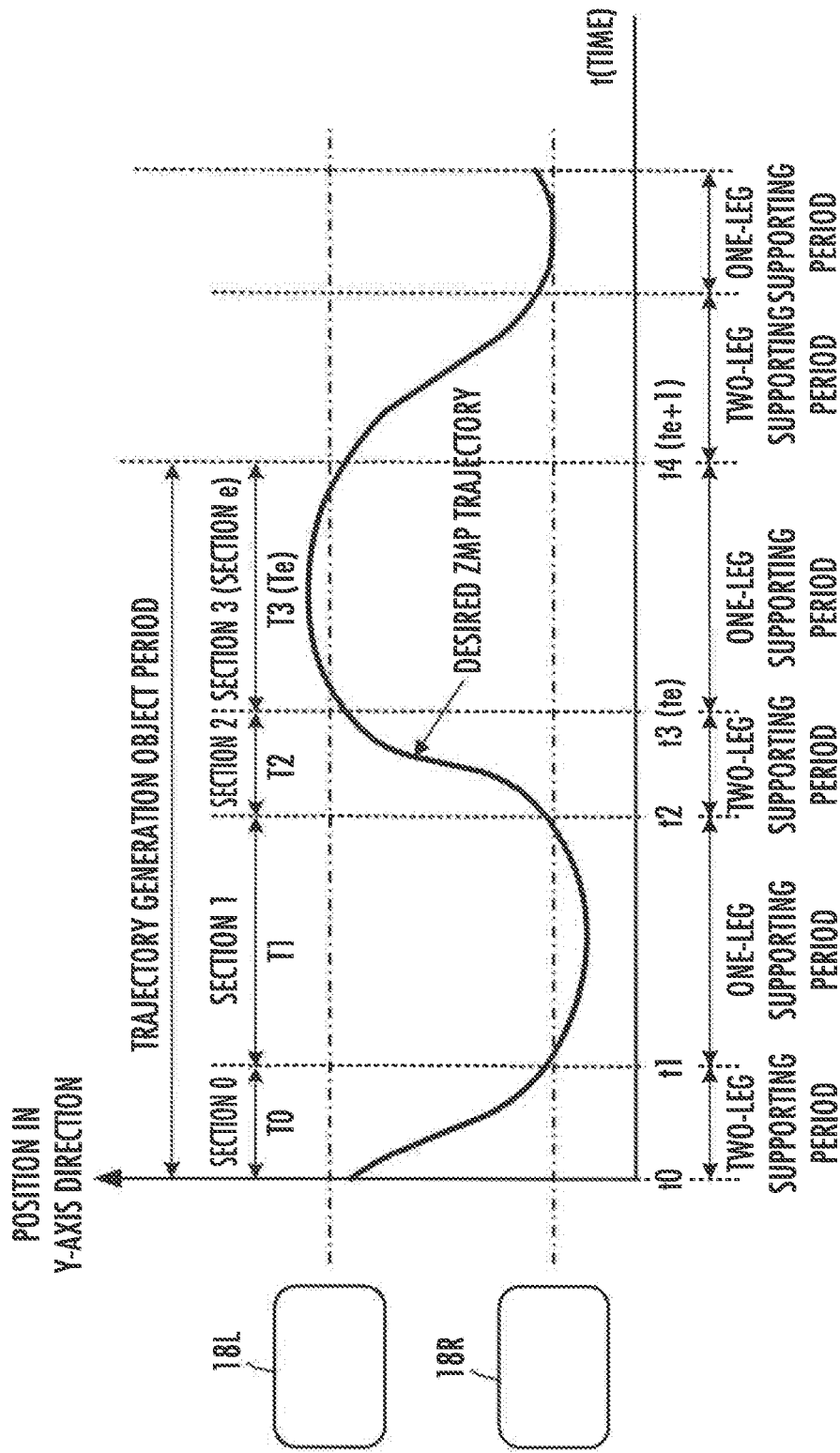
FIG. 3 shows, by way of example, desired landing positions of the feet at the time of movement of the legged mobile robot and corresponding desired ZMP trajectory (in the Y-axis direction)

In the present embodiment, the desired ZMP trajectory generating unit 52 divides a trajectory generation object period into a plurality of sections i (i=0, 1, . . . , e), as illustrated in FIG. 3. Here, the trajectory generation object period is a predetermined period of time for which the unit 52 is to newly generate a desired ZMP trajectory at each timing when the desired gait generating unit 42 carries out the processing of generating a desired gait (such as a trajectory of desired joint displacement amount).

It should be noted that the desired ZMP trajectory in FIG. 3 shows, by way of example, a trajectory of a position in the Y-axis direction of the desired ZMP in the case where the robot 1 walks straight ahead. The foot 18R in the figure indicates a desired landing position in the Y-axis direction of the foot 18R when the foot 18R is moved with the right leg link mechanism 3R as a free leg. The foot 18L in the figure indicates a desired landing position in the Y-axis direction of the foot 18L when the foot 18L is moved with the leg link mechanism 3L as a free leg.

In the illustrated example, the trajectory generation object period is divided in such a manner that each section i becomes a period of either a one-leg supporting period or a two-leg supporting period, for example. The way of dividing the trajectory generation object period, however, may be different from the above. For example, the trajectory generation object period may be divided into a greater number of sections. Further, the trajectory generation object period may be divided such that each section i has a same time width T_i, for example.

In the processing in the desired ZMP trajectory generating unit 52, a desired ZMP trajectory (specifically, trajectory of each component of a vector $\uparrow Pzmp=[Xzmp, Yzmp]^T$ composed of the position Xzmp in the X-axis direction and the position Yzmp in the Y-axis direction of the desired ZMP in the global coordinate system) in each section i constituting the trajectory generation object period is expressed by a polynomial function specific to that section i. It should be noted that the position in the Z-axis direction of the desired ZMP is defined as a position in the Z-axis direction of the point on the floor surface where the position in the X-axis direction and the position in the Y-axis direction become Xzmp and Yzmp, respectively.

As used herein, "↑" at the head of a given variable indicates that the variable is a vector (column vector), and the superscript "T" represents transposition of a vector or matrix.

A desired ZMP trajectory (trajectory of ↑Pzmp) in each section i (i=0, 1, . . . , e) is defined as a function of time t, by a polynomial function in the form of the following expression (1).

$$\uparrow Pzmp\_i(t) = \sum_{j=0}^{n} \uparrow W\_i, j \cdot (tc\_i(t))^j \quad (1)$$

$$= \uparrow W\_i, 0 + \uparrow W\_i, 1 \cdot (tc\_i(t)) + \uparrow W\_i, 2 \cdot (tc\_i(t))^2 +$$

$$\ldots + \uparrow W\_i, n \cdot (tc\_i(t))^n$$

where $$\uparrow Pzmp\_i(t) = \begin{pmatrix} Xzmp\_i(t) \\ Yzmp\_i(t) \end{pmatrix}$$

$$\uparrow W\_i, j = \begin{pmatrix} Wx\_i, j \\ Wy\_i, j \end{pmatrix}$$

tc_i(t):

$$\text{when } t\_i \le t \le t\_i+1, \quad tc\_i(t) = \frac{t - t\_i}{T\_i} \quad (1a)$$

$$\text{when } t < t\_i \text{ or } t > t\_i+1, \quad tc\_i(t) = 0 \quad (1b)$$

Here, $\uparrow Pzmp\_i(t)$ ($=[Xzmp\_i(t), Yzmp\_i(t)]^T$) on the left side of the expression (1) is a two-component vector indicating the position of the desired ZMP (position Xzmp_i(t) in the X-axis direction and position Yzmp_i(t) in the Y-axis direction) at a time t in a section i, n on the right side of the expression (1) is the degree of a polynomial function that expresses each component Xzmp_i(t), Yzmp_i(t) of ↑Pzmp_i(t) (hereinafter, this may be referred to as "desired ZMP vector ↑Pzmp_i(t)), and $\uparrow W\_i,j$ ($=[Wx\_i,j, Wy\_i,j]^T$) (j=0, 1, . . . , n) is a vector composed of a coefficient Wx_i,j of a term of degree j among the terms of the polynomial function expressing Xzmp_i(t), and a coefficient Wy_i,j of a term of degree j among the terms of the polynomial function expressing Yzmp_i(t).

It should be noted that, in the present embodiment, the degree n of the polynomial function that expresses each component Xzmp_i(t), Yzmp_i(t) of the desired ZMP vector ↑Pzmp_i(t) is, for example, "9".

Further, tc_i(t) on the right side of the expression (1), representing a normalized time of the section i, is defined by the expressions (1a) and (1b). In these expressions (1a) and (1b), t_i is a starting time of the section i, t_i+1 is an ending time of the section i (=starting time of a section i+1), and T_i is a time width of the section i.

Therefore, the normalized time tc_i(t) defined by the expressions (1a) and (1b) is a time normalized by regarding the starting time t_i of each section i as "0" and the time width T_i as "1".

In the case where each component Xzmp_i(t), Yzmp_i(t) of the desired ZMP vector ↑Pzmp_i(t) in each section i in the trajectory generation object period is expressed by a polynomial function as described above, the desired ZMP trajectory in the trajectory generation object period (the entire trajectory of ↑Pzmp_0(t) through ↑Pzmp_e(t)) is defined by values of the coefficients Wx_i,j, Wy_i,j (i=0, 1, . . . , e; j=0, 1, . . . , n) in respective terms of the polynomial functions for respective ones of all the sections i in the trajectory generation object period.

Thus, the desired ZMP trajectory generating unit 52 handles the coefficients Wx_i,j, Wy_i,j in the respective terms of the polynomial functions that express the components Xzmp_i(t), Yzmp_i(t) of the desired ZMP vector ↑Pzmp_i(t) in the respective sections i constituting the trajectory generation object period, as variables (unknown variables) to be determined in the processing of generating a desired ZMP trajectory. Hereinafter, the coefficients Wx_i, j, Wy_i,j (i=0, 1, . . . , e; j=0, 1, . . . , n) in the polynomial function will be referred to as "ZMP trajectory variables".

A ZMP is a point that should exist in a so-called supporting polygon, so the position of the desired ZMP in a biped gait is affected by the desired landing position/posture of each foot 18, as illustrated for example by the graphs a1, a2 on the right in FIG. 4.

Here, the solid line graph a1 in FIG. 4 shows, by way of example, an appropriate desired ZMP trajectory (trajectory in the X-axis direction of the desired ZMP) in the case (first case) where the desired landing positions/postures of the first and second steps set in the landing goal setting unit 51 correspond to the positions/postures of the feet 18L(1), 18R(2) shown by the solid lines on the left in FIG. 4. The two-dot-dash line graph a2 in FIG. 4 shows, by way of example, an appropriate desired ZMP trajectory (trajectory in the X-axis direction of the desired ZMP) in the case (second case) where the desired landing position of the first step alone, for example, among the desired landing positions/postures of the first and second steps is changed from the position in the first case to a position of the foot 18L(1) shown by the two-dot-dash line. In the graphs a1 and a2, for convenience sake, the desired ZMP trajectory in each section i (i=0, 1, 2, . . . ) is set to be a trajectory expressed by a linear function.

As illustrated in the graphs a1 and a2 in FIG. 4, for example when the desired landing position of the foot 18L(1) of the leg link mechanism 3L as the free leg on the first step is changed, the appropriate desired ZMP trajectory is changed in the period of one-leg supporting period (section 3 in FIG. 4) where the foot 18L(1) is in contact with the floor and in its preceding and succeeding periods of two-leg supporting periods (sections 2 and 4 in FIG. 4). In this case, the change amount of the desired ZMP trajectory in the period of one-leg supporting period in which the foot 18L(1) is in contact with the floor may be considered to be approximately equal to the change amount of the desired landing position of the foot 18L(1).

It should be noted that for example in the case where the desired landing position of the foot 18R(2) of the leg link mechanism 3R as the free leg on the second step is changed, the appropriate desired ZMP trajectory is changed in the period of one-leg supporting period (section 5 in FIG. 4) where the foot 18R(2) is in contact with the floor and in its preceding and succeeding periods of two-leg supporting periods.

In this manner, the desired ZMP trajectory is affected by the desired landing position/posture of each foot 18. Thus, in the present embodiment, in addition to the aforesaid ZMP trajectory variables Wx_i,j, Wy_i,j, the desired landing position on a predetermined number step in the aforesaid trajectory generation object period is set to be a desired landing position to be corrected, which may be corrected as appropriate from the desired landing position set in the landing goal setting unit 51.

Then, in the present embodiment, in addition to the ZMP trajectory variables Wx_i,j, Wy_i,j, the correction amount (hereinafter, referred to as "landing position correction amount") of the desired landing position on the step to be corrected, or a parameter having a certain relationship with the landing position correction amount, is also treated as a variable (unknown variable) to be determined in the processing of generating a desired ZMP trajectory. It should be noted that the landing position correction amount is a correction amount from the desired landing position set in the landing goal setting unit 51.

Hereinafter, the landing position correction amount on the k-th step (k=0, 1, 2, . . . ) will be expressed as ↑ΔPft(k)= [ΔPftx(k), ΔPfty(k)]$^T$ (where ΔPftx(k) is a landing position correction amount in the X-axis direction, and ΔPfty(k) is a landing position correction amount in the Y-axis direction). In the present embodiment, the landing position correction amount ↑ΔPft(k) is defined to be expressed in the form of the following expression (2) by using an appropriate matrix S and variable vector ↑Wft(k).

$$\uparrow \Delta Pft(k) = Sm \cdot \uparrow Wft(k) \tag{2}$$

where $$Sm = \begin{pmatrix} 1 & 0 & -1 & 0 \\ 0 & 1 & 0 & -1 \end{pmatrix} \tag{2a}$$

$$\uparrow Wft(k) = \begin{pmatrix} Wftxp(k) \\ Wftyp(k) \\ Wftxn(k) \\ Wftyn(k) \end{pmatrix} \tag{2b}$$

$$\uparrow \Delta Pft(k) = \begin{pmatrix} \Delta Pftx(k) \\ \Delta Pfty(k) \end{pmatrix}$$
$$= \begin{pmatrix} Wftxp(k) - Wftxn(k) \\ Wftyp(k) - Wftyn(k) \end{pmatrix} \tag{2c}$$

Here, in the present embodiment, in order to introduce L1 norm into an evaluation function (cost function) described later, a two by four matrix indicated by the above expression (2a) is used as the matrix Sm, and a four-component vector indicated by the above expression (2b) is used as the variable vector ↑Wft(k).

In this case, the relationship between the components of the landing position correction amount ↑ΔPft(k) and the components of the variable vector ↑Wft(k) is expressed by the above expression (2c). Hereinafter, the variable vector ↑Wft(k) will be referred to as "landing position correction variable vector", and the components Wftxp(k), Wftxn(k), Wftyp(k), and Wftyn(k) of ↑Wft(k) will be referred to as "landing position correction variables". The landing position correction variables Wftxp(k), Wftxn(k), Wftyp(k), and Wftyn(k) correspond to the parameters in the present invention, which have a linear relationship, expressed by the expression (2), with the landing position correction amount ↑ΔPft(k).

In the present embodiment, the ZMP trajectory variables Wx_i,j, Wy_i,j (i=0, 1, . . . , e; j=0, 1, . . . , n), and the landing position correction variables Wftxp(k), Wftxn(k), Wftyp(k), and Wftyn(k) corresponding to the landing position correction amount ↑ΔPft(k) on the k-th step are the variables (unknown variables) to be determined in the processing of generating a desired ZMP trajectory.

The desired ZMP trajectory generating unit 52 determines these unknown variables to be determined, composed of the ZMP trajectory variables Wx_i,j, Wy_i,j and the landing position correction variables Wftxp(k), Wftxn(k), Wftyp(k), and Wftyn(k), by an algorithm of a known solution method for a quadratic programming problem, by using an evaluation function (cost function) regarding the unknown variables and a plurality of linear constraints expressed by linear equalities or linear inequalities regarding the unknown variables.

That is, the desired ZMP trajectory generating unit 52 carries out, by an algorithm of a known solution method for a quadratic programming problem, the processing of determining the whole of the ZMP trajectory variables Wx_i,j, Wy_i,j and the landing position correction variables Wftxp(k), Wftxn(k), Wftyp(k), and Wftyn(k), under the plurality of linear constraints, so as to minimize the value of the evaluation function.

In this case, in the present embodiment, the following are used as the linear constraints regarding the ZMP trajectory variables Wx_i,j, Wy_i,j and the landing position correction variables Wftxp(k), Wftxn(k), Wftyp(k), and Wftyn(k): a constraint condition (hereinafter, "stabilization condition") for maintaining the center of gravity of the robot 1 as the inverted pendulum mass point in the aforesaid inverted pendulum model in a stable state continuously, a constraint condition (hereinafter, "via point condition") defining a via point of a desired ZMP trajectory; a constraint condition (hereinafter, "trajectory connection condition") regarding connection of desired ZMP trajectories at a boundary between the neighboring sections i−1 and i (i=1, 2, . . . , e) in the trajectory generation object period; a constraint condition (hereinafter, "ZMP existence permissible region condition") for restricting the position of the desired ZMP to a position within a supporting polygon; and a constraint condition (hereinafter, "geometric condition") for restricting in a geometric sense the landing position of a foot 18 of a free leg with respect to a foot 18 of a supporting leg of the robot 1.

The stabilization condition, via point condition, and trajectory connection condition are constraint conditions expressed by linear equalities, and the ZMP existence permissible region condition and geometric condition are constraint conditions expressed by linear inequalities. The linear equality is an equality which expresses a relationship that a linear combination of a plurality of variables from among the ZMP trajectory variables Wx_i,j, Wy_i,j and the landing position correction variables Wftxp(k), Wftxn(k), Wftyp(k), and Wftyn(k) equals a certain constant value. The linear inequality is an inequality which expresses a relationship that a linear combination of the plurality of variables is greater or smaller than a certain constant value.

It should be noted that the stabilization condition, the via point condition, and the ZMP existence permissible region condition correspond to the second constraint condition, the third constraint condition, and the first constraint condition, respectively, of the present invention.

Linear equalities or linear inequalities expressing the constraint conditions will now be described specifically. In the following description of the present embodiment, the desired landing position to be corrected by the landing position correction amount $\uparrow \Delta Pft(k)$ is a desired landing position of the first step, for example.

Firstly, the stabilization condition is, in the present embodiment, a constraint condition expressed as a condition (hereinafter, referred to as "divergence component condition") that a value of a divergence component (hereinafter, referred to as "terminal divergence component") of the inverted pendulum model at an ending time of the trajectory generation object period (period for two steps) agrees with a value of a divergence component (hereinafter, referred to as "normal-gait initial divergence component") of the inverted pendulum model at a starting time (=ending time of the trajectory generation object period) of a normal gait as a virtual gait that follows the gait of the robot 1 in the trajectory generation object period.

It should be noted that the normal gait and the divergence components are described in detail in the aforesaid Japanese Patent No. 3726081 or U.S. Pat. No. 6,876,903, for example. Therefore, only a brief description will be made in the present embodiment.

The normal gait is a gait which is virtually assumed as a gait following the gait (up to the second step in the present embodiment) of the robot 1 in the trajectory generation object period, and which allows the robot 1 to move continuously, with the motions of the portions of the robot 1, including each moving/landing portion and the body 2, repeated cyclically in a certain pattern.

In the present embodiment, the normal gait in the case where the robot 1 travels in a biped gait operation is, as shown for example in FIG. 4, a cyclic gait (with a period of two steps as one cycle) that follows the operation on the second step of the robot 1 in the trajectory generation object period. In FIG. 4, the landing position/posture of the foot 18 at each step in the normal gait is shown by a broken line.

Further, the divergence component of the inverted pendulum model at a given time t is a value $\uparrow q(t)$ (vector composed of component qx(t) in the X-axis direction and component qy(t) in the Y-axis direction) which is defined as a linear combination of the position $\uparrow Ppend$ of the inverted pendulum mass point as the center of gravity of the robot 1 and the moving velocity $d\uparrow Ppend(t)/dt$ (temporal change rate of $\uparrow Ppend$) of the inverted pendulum mass point, as expressed by the following expression (3).

$$\uparrow q(t) = [qx(t), qy(t)]^T \qquad (3)$$
$$= \uparrow Ppend(t) + (1/\omega) \cdot d\uparrow Ppend(t)/dt$$

where $\omega = \sqrt{(g/h)}$

It should be noted that g is a gravitational acceleration constant, h is a height (constant value) of the inverted pendulum mass point, and $\sqrt{(g/h)}$ is a square root of (g/h).

By setting a desired ZMP trajectory so as to fulfill the aforesaid divergence component condition for the divergence component defined as described above, it is possible to determine a desired gait of the robot 1 in the trajectory generation object period in such a manner that it converges to a motional state of the robot 1 in a normal gait (and, hence, that stability of the center of gravity of the robot 1 can be maintained) in the future following the trajectory generation object period.

Thus, in the present embodiment, the divergence component condition is used as one constraint condition (stabilization condition) in the processing of generating a desired ZMP trajectory. It should be noted that the divergence component corresponds to the motional state of the inverted pendulum mass point concerning the second constraint condition in the present invention.

Here, when a change amount of the divergence component (more specifically, a change amount of a value of the divergence component at the ending time t_e+1 of the trajectory generation object period) that occurs in response to a change of the desired landing position of the first step by the landing position correction amount ↑ΔPft(1) is represented as ↑Δqft(1), a desired value of the divergence component at the ending time t_e+1 of the trajectory generation object period (value of the divergence component at the starting time of a normal gait) as ↑qtarget, and a value of the divergence component at the starting time t_0 of the trajectory generation object period as ↑q(t_0), then the stabilization condition is expressed by the following expression (4).

$$\uparrow qzmp(\text{t\_e}+1) + \uparrow \Delta qft(1) = \exp(-\omega \cdot (\text{t\_e}+1)) \cdot \uparrow qtarget - \uparrow q(\text{t\_0}) \quad (4)$$

In this case, exp( ) is an exponential function of the base e of a natural logarithm. Of the left side of the expression (4), ↑qzmp(t_e+1) is given by the following expression (5), and ↑Δqft(1) is given by the following expression (6).

$$\uparrow qzmp(\text{t\_e}+1) = -\omega \cdot \int_{\text{t\_0}}^{\text{t\_e}+1} \exp(-\omega \cdot t) \cdot \uparrow Pzmp(t) dt \quad (5)$$

$$= -\omega \cdot \sum_{i=0}^{e} \int_{\text{t\_i}}^{\text{t\_i}+1} \left( \exp(-\omega \cdot t) \cdot \sum_{j=0}^{n} \uparrow W\_i, j \cdot (\text{tc\_i}(t))^j \right) dt$$

$$= -\omega \cdot \sum_{i=0}^{e} \int_{0}^{1} \left( \exp(-\omega \cdot (T\_i \cdot \text{tc\_i} + \text{t\_i})) \cdot \sum_{j=0}^{n} \uparrow W\_i, j \cdot (\text{tc\_i})^j \right) d\text{tc\_i}$$

$$= -\sum_{i=0}^{e} \exp(-\omega \cdot \text{t\_i}) \cdot \left( \sum_{j=0}^{n} \uparrow W\_i, j \cdot S\_i, j \right)$$

where $$S\_i, j = j! \cdot (\omega\_i)^{-j} - \exp(\omega\_i) \cdot \sum_{k=0}^{j} {}_jP_{j-k} \cdot (\omega\_i)^{-(j-k)}$$

$$\omega\_i = \omega \cdot T\_i$$

$${}_jP_{j-k} = \frac{j!}{k!}$$

$$\uparrow \Delta qft(1) = \alpha 1 \cdot \uparrow \Delta Pft(1) \quad (6)$$
$$= d \cdot Sm \cdot \uparrow Wft(1)$$

where $$\alpha 1 = \zeta(1, T2) + \exp(-\omega \cdot t3) \cdot \zeta(1, T3) + \exp(-\omega \cdot t2) \cdot \zeta(0, T4) - \zeta(1, T4)$$

$$\zeta(m, Ta) = m! \cdot \omega^{-m} - \exp(\omega \cdot Ta) \cdot \sum_{k=0}^{m} {}_mP_{m-k} \cdot Ta^k \omega^{-(m-k)}$$

(m = 0 or 1, Ta = T1 or T3 or T4)

It should be noted that j!, k!, and m! are the factorial of j, the factorial of k, and the factorial of m, respectively.

By substituting the expressions (5) and (6) into the expression (4), the divergence component condition (stabilization condition) is expressed by the following expression (7).

$$\sum_{i=0}^{e} \sum_{j=0}^{n} a\_i, j \cdot \begin{pmatrix} Wx\_i, j \\ Wy\_i, j \end{pmatrix} + \alpha 1 \cdot Sm \cdot \uparrow Wft(1) = \begin{pmatrix} C1x \\ C1y \end{pmatrix} \quad (7)$$

where $$a\_i, j = \exp(-\omega \cdot \text{t\_1}) \cdot S\_i, j$$

$$\begin{pmatrix} C1x \\ C1y \end{pmatrix} = \exp(-\omega \cdot (\text{t\_e}+1)) \cdot \uparrow qtarget - \uparrow q(\text{t\_0})$$

Here, a first component of the vector (two-component vector) on the left side of the expression (7) is a linear combination of the ZMP trajectory variable Wx_i,j (i=0, 1, ..., e; j=0, 1, ..., n) and the landing position correction variables Wftxp(1) and Wftxn(1), and a second component of the vector is a linear combination of the ZMP trajectory variable Wy_i,j (i=0, 1, ..., e; j=0, 1, ..., n) and the landing position correction variables Wftyp(1) and Wftyn(1).

Of the vector $[C1x, C1y]^T$ on the right side of the expression (7), the first component C1x and the second component C1y are constant values. Therefore, the stabilization condition (divergence component condition) is expressed by the linear equality of the expression (7).

Thus, in the present embodiment, the desired ZMP trajectory generating unit 52 sets the above expression (7) as a linear equality that expresses the stabilization condition. In this case, the constant values C1x, C1y are calculated in a manner similar to that described in the aforementioned Japanese Patent Application Laid-Open No. 2017-30123 or US Patent Application Laid-Open No. 2017/0036346.

It should be noted that ↑qzmp(t_e+1) is a component, among the divergence components, that is according to the reference desired landing position and the reference desired landing posture set in the landing goal setting unit 51, and ↑Δqft(1) is a component according to the landing position correction variables Wftxp(1), Wftxn(1), Wftyp(1), and Wftyn(1).

Next, the aforesaid via point condition is, more specifically, a condition that the desired ZMP trajectory in the trajectory generation object period passes through a via point in a prescribed position at a prescribed time tf determined in advance.

Figure 5:
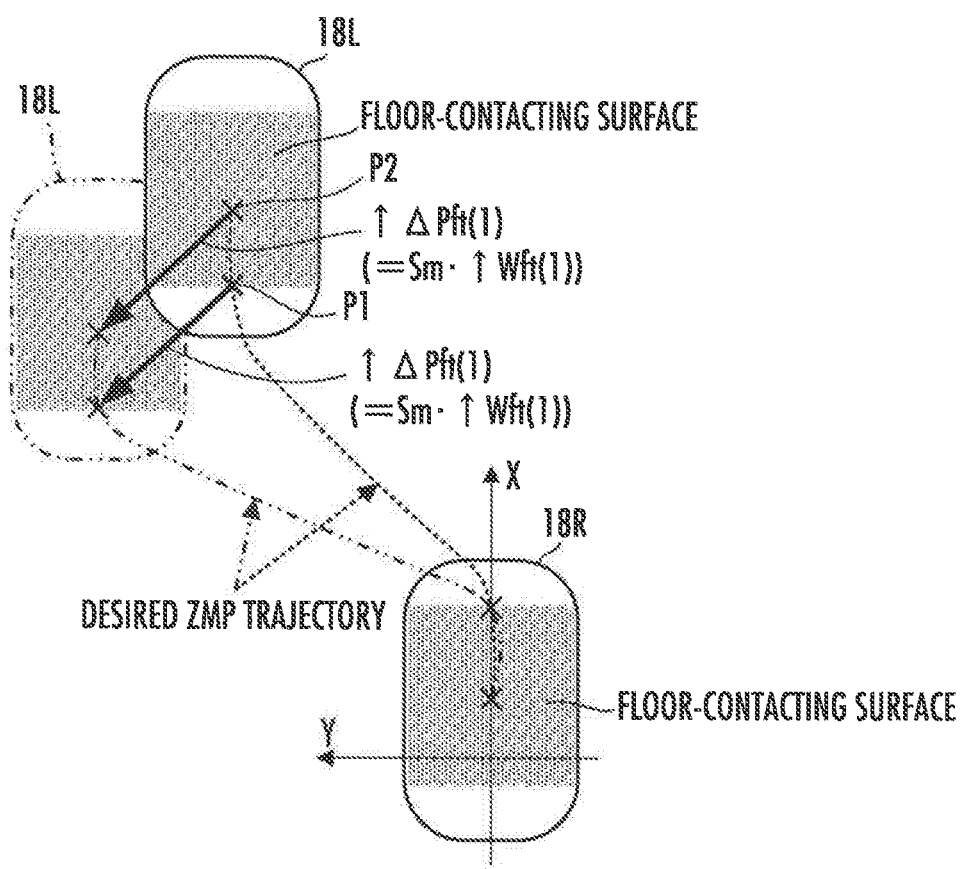
FIG. 5 illustrates setting a linear equality regarding a via point condition as a constraint condition.

In the present embodiment, the position of the via point is, as illustrated in FIG. 5, a position within the floor-contacting surface of a foot 18 that is in the floor-contacting state. The position of the via point relative to the foot 18 is unchanged irrespective of the position of the foot 18 in the global coordinate system.

Thus, as shown in FIG. 5, in the case where the via point at a certain time is a point (for example, point P1, P2 in FIG. 5) within the floor-contacting surface after landing of the foot 18 (foot 18L in FIG. 5) on the first step as a target of correction of the desired landing position, if the desired landing position of the foot 18L is corrected by ↑ΔPft(1) (=Sm·↑Wft(1)), the via point will also be shifted by ↑ΔPft(1).

Accordingly, when a position of the via point at time tf within a section (any one of the aforesaid sections 2, 3, and 4) in the trajectory generation object period where the foot 18 of the first step is in the floor-contacting state (or, position within the floor-contacting surface of the foot 18 of the first step assuming that ↑ΔPft(1) is a zero vector) is represented as ↑Pvia(tf) (=[Xvia(tf), Yvia(tf)]$^T$, and the section to which the time tf belongs as section if, then the via point condition regarding that via point is expressed by the following expression (8).

$$\sum_{j=0}^{n} \begin{pmatrix} Wx\_if \\ Wy\_if \end{pmatrix} \cdot (tc\_if(tf))^j = \begin{pmatrix} Xvia(tf) \\ Yvia(tf) \end{pmatrix} + Sm \cdot \uparrow Wft(1) \quad (8)$$

Organizing this expression (8) yields a linear equality of the following expression (9).

$$\sum_{j=0}^{n} \begin{pmatrix} Wx\_if \\ Wy\_if \end{pmatrix} \cdot (tc\_if(tf))^j - Sm \cdot \uparrow Wft(1) = \begin{pmatrix} Xvia(tf) \\ Yvia(tf) \end{pmatrix} \quad (9)$$

Thus, the desired ZMP trajectory generating unit 52 uses the value (constant value) of the position ↑Pvia(tf) corresponding to each via point and the time tf to set the above expression (9) as the linear equality expressing the via point condition.

It should be noted that in the case where the via point is a point within the floor-contacting surface of a foot 18 the desired landing position of which is not a target of correction (in the present embodiment, the foot 18 to be landed on the second step, or the foot (18R in FIG. 5) of the leg link mechanism 3 that is the supporting leg for the first step), the via point condition regarding that via point is expressed by a linear equality corresponding to the expression (9) with the second term (the term including ↑Wft(1)) on the left side removed therefrom.

Next, the ZMP existence permissible region condition is, more specifically, a condition that the desired ZMP at a given time in the trajectory generation object period exists within a supporting polygon which matches or approximates a smallest convex region that includes the floor-contacting surface of the robot 1 at that time.

It should be noted that the convex region is, in a one-leg supporting period, a region formed by the floor-contacting surface of the foot 18 of a leg link mechanism 3 as a supporting leg, and, in a two-leg supporting period, a region including both of the floor-contacting surfaces of the feet 18R, 18L of the leg link mechanisms 3R, 3L.

Figure 6A:
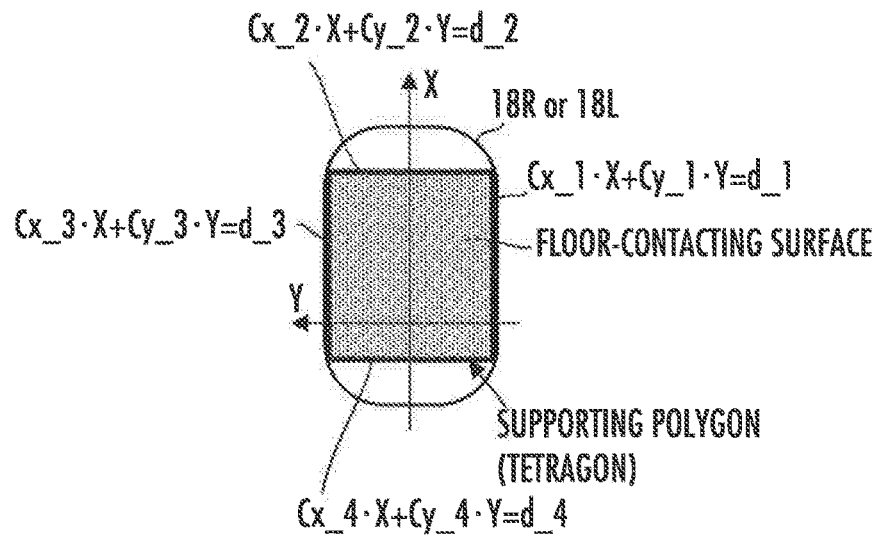
FIG. 6A shows, by way of example, a supporting polygon in a one-leg supporting period.
Figure 6B:
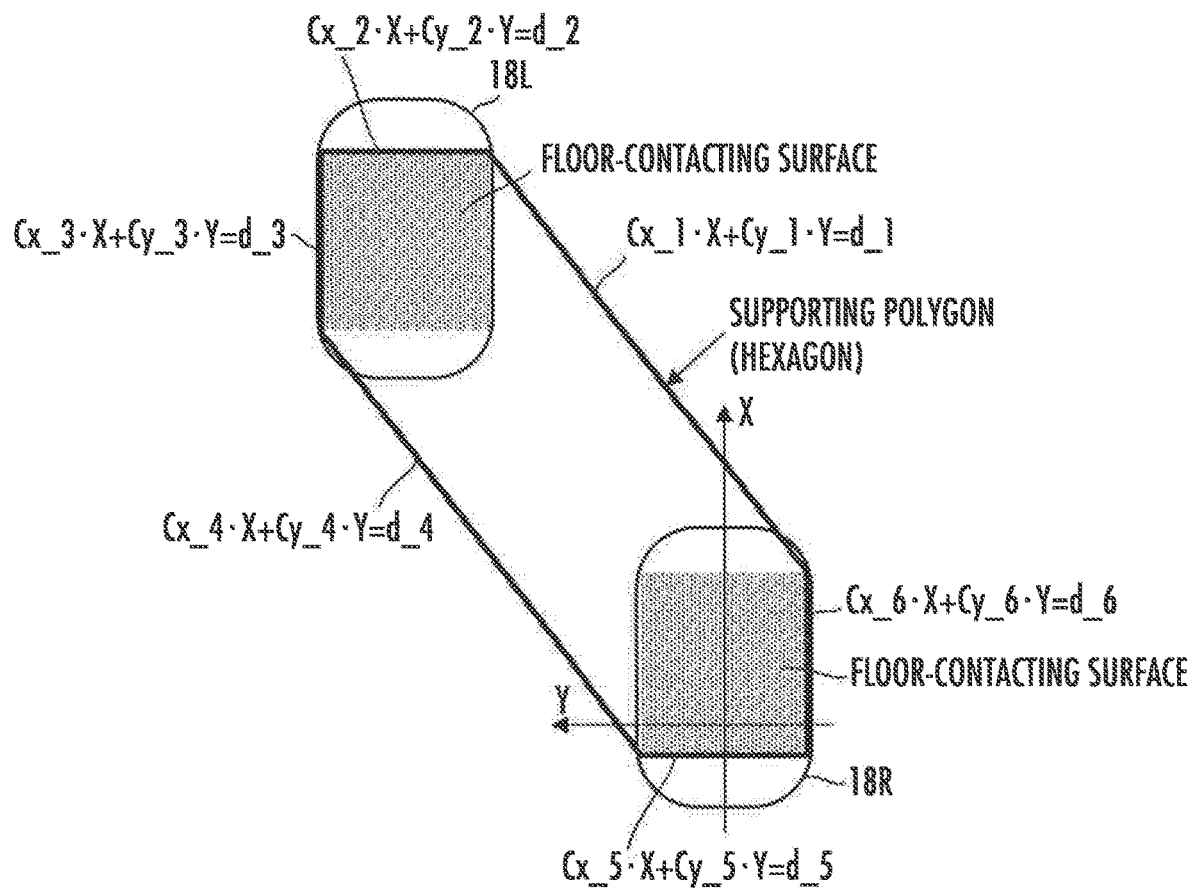
FIG. 6B shows, by way of example, a supporting polygon in a two-leg supporting period.

In the present embodiment, the supporting polygon in a one-leg supporting period in which only a foot 18 of one of the leg link mechanisms 3R, 3L is in contact with the floor is represented as a tetragon, as illustrated in FIG. 6A for example, and the supporting polygon in a two-leg supporting period in which the feet 18R, 18L of both leg link mechanisms 3R, 3L are in contact with the floor is represented as a hexagon, as illustrated in FIG. 6B for example.

Here, the stippled region in FIG. 6A represents an example of the floor-contacting surface of a foot 18 (18R or 18L) in a one-leg supporting period, and the stippled regions in FIG. 6B represent examples of the floor-contacting surfaces of the respective feet 18R and 18L in a two-leg supporting period. In the illustrated examples, each supporting polygon matches or almost matches the smallest convex region described above, although the supporting polygon may be a polygonal region inside the convex region.

Each side of the supporting polygon, when projected on the XY coordinate plane of the global coordinate system, is expressed by the following expression (10).

$$Cx\_m \cdot x + Cy\_m \cdot y = d\_m \quad (10)$$

where m=1, 2 . . . , M

It should be noted that the suffix m represents the number applied to a side of the supporting polygon, and M is a total number of the sides included in the supporting polygon. Further, Cx_m, Cy_m, and d_m are constant values determined for the side of the number m. The values of these constant values Cx_m, Cy_m, and d_m can be determined from the positions of two points (for example, points on corners of the supporting polygon) on a straight line including each side.

Of the trajectory generation object period, in a period (in the present embodiment, periods of the aforesaid sections 0, 1) in which the supporting polygon does not include a floor-contacting surface of a foot 18 as a target of correction of the desired landing position, the ZMP existence permissible region condition is expressed by a set of M inequalities (11-m) (m=1, 2, . . . , M) corresponding respectively to the sides of the supporting polygon.

$$Cx\_m \cdot Xzmp + Cy\_m \cdot Yzmp < d\_m \quad (11\text{-}m)$$

where m=1, 2, . . . , M

Here, the desired ZMP vector ↑Pzmp_i=[Xzmp_i, Yzmp_i]$^T$ in each section i in the trajectory generation object period is expressed by the above expression (2). Therefore, the ZMP existence permissible region condition at a given time t (in the normalized time, time tc_i(t)) in a given section i in the trajectory generation object period in which the supporting polygon does not include a floor-contacting surface of a foot 18 as a target of correction of the desired landing position is expressed by the following M linear inequalities (12-m) (m=1, 2, . . . , M).

$$Cx\_m \cdot \sum_{j=0}^{n} (tc\_i(t))^j \cdot Wx\_i, j + \\ Cy\_m \cdot \sum_{j=0}^{n} (tc\_i(t))^j \cdot Wy\_i, j < d\_m \quad (12\text{-}m)$$

where m=1, 2, . . . , M

On the other hand, in a period (in the present embodiment, periods of the aforesaid sections 2 to 5) in the trajectory generation object period in which the supporting polygon includes the floor-contacting surface of the foot 18 (of the first step) as a target of correction of the desired landing position, the ZMP existence permissible region condition is set in the following manner.

In the present embodiment, it is considered that in the period (of the aforesaid section 2) of a two-leg supporting period immediately after landing of the foot 18 (on the first step) as a target of correction of the desired landing position, the supporting polygon at the starting time of the two-leg supporting period agrees approximately with a supporting polygon (shown by the solid line in FIG. 7) in the state where there is no correction for the desired landing position of the foot 18 (18L in FIG. 7) on the first step (when ↑ΔPft(1)=↑0). Further, it is considered that the supporting polygon at the ending time of the two-leg supporting period agrees approximately with a supporting polygon (shown by the two-dot-dash line in FIG. 7) obtained by translating the supporting polygon at the starting time of the two-leg supporting period by the landing position correction amount ↑ΔPft(1) for the foot 18 (18L) on the first step. It should be noted that the supporting polygon shown by the broken line in FIG. 7 indicates an actual supporting polygon in the state where correction is performed on the desired landing position of the foot 18 (18L) on the first step (when ↑ΔPft(1)≠↑0).

Figure 7:
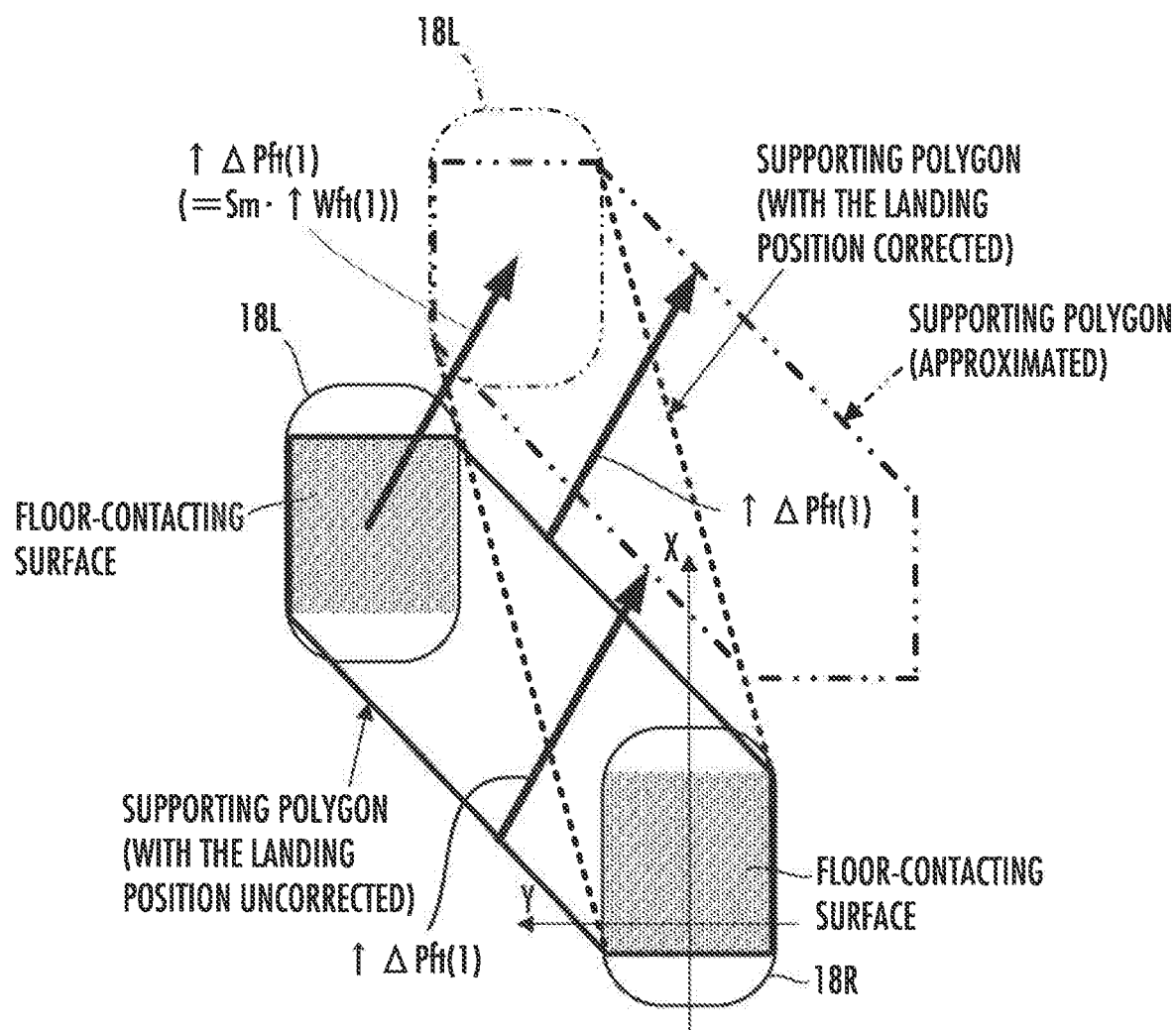
FIG. 7 illustrates setting a linear inequality regarding a ZMP existence permissible region condition as a constraint condition.

It is also considered that during the two-leg supporting period, the supporting polygon is translated continuously at a constant moving speed from the supporting polygon at the starting time of the two-leg supporting period to the supporting polygon at the ending time thereof. The supporting polygon shown by the broken line in FIG. 7 is an actual supporting polygon (in the two-leg supporting period) obtained by correcting the desired landing position of the foot 18 on the first step by ↑ΔPft(1).

Accordingly, a supporting polygon at a given sampling time in the two-leg supporting period is set as one that approximates a supporting polygon obtained by translating the supporting polygon (reference supporting polygon) at the start of the two-leg supporting period by the displacement amount which is obtained by dividing the landing position correction amount for the foot 18 on the first step (foot 18 as the target of correction of the desired landing position) in accordance with the ratio of the time difference from the start to the sampling time in the two-leg supporting period to the time width of the two-leg supporting period.

In this case, when each side of the supporting polygon at the start of the period (of the aforesaid section 2) of the two-leg supporting period immediately after landing of the foot 18 on the first step is expressed by the above expression (10), the ZMP existence permissible region condition at a given time t (in the normalized time, time tc_i(t)) in the period of the two-leg supporting period is expressed by the following M linear inequalities (13-m) (m=1, 2, . . . , M).

$$Cx\_m \cdot \sum_{j=0}^{n} (tc\_i(t))^j \cdot Wx\_i, j + Cy\_m \cdot \sum_{j=0}^{n} (tc\_i(t))^j \cdot Wy\_i, \qquad (13\text{-}m)$$

$$j - tc\_i(t) \cdot C\_m \cdot (Sm \cdot \uparrow Wft(1)) < d\_m$$

where
m=1, 2, . . . , M $C\_m=(Cx\_m Cy\_m)$

In this case, the section i in the expression (13-m) is the section (aforesaid section 2) of the two-leg supporting period immediately after landing of the foot 18 on the first step.

Further, in the trajectory generation object period (sections 0 through 3), the ZMP existence permissible region condition in the one-leg supporting period (section 3) following the two-leg supporting period (section 2) is expressed by the following linear inequality (14-m) which is obtained by setting tc_i(t) on the left side of the above expression (13-m) to "1".

$$Cx\_m \cdot \sum_{j=0}^{n} (tc\_i(t))^j \cdot Wx\_i, j + Cy\_m \cdot \sum_{j=0}^{n} (tc\_i(t))^j \cdot Wy\_i, \qquad (14\text{-}m)$$

$$j - C\_m \cdot (Sm \cdot \uparrow Wft(1)) < d\_m$$

where
m=1, 2, . . . , M $C\_m=(Cx\_m Cy\_m)$

In the present embodiment, the desired ZMP trajectory generating unit 52 sets, for each section i in the trajectory generation object period, the inequality expressed by the above expression (12-m), (13-m), or (14-m) as the linear inequality expressing the ZMP existence permissible region condition.

More specifically, the desired ZMP trajectory generating unit 52 firstly sets a plurality of sampling times (in prescribed increments, for example) in the trajectory generation object period, and sets the expression (expression (10)) for each side of the supporting polygon at each sampling time, on the basis of the desired landing position/posture (set in the landing goal setting unit 51) of a foot 18R 18L that is in the floor-contacting state in the section within which the sampling time falls.

Then, in the aforesaid sections 0 and 1, the desired ZMP trajectory generating unit 52 sets, for each sampling time, M linear inequalities expressed by the above expression (12-m), as linear inequalities expressing the ZMP existence permissible region condition, by using the value of that time t as well as set values of the constant values Cx_m, Cy_m, and d_m which express the expressions of the respective sides of the supporting polygon set for that time.

Further, in the aforesaid section 2 (period of the two-leg supporting period immediately after landing of the foot 18 on the first step), the desired ZMP trajectory generating unit 52 sets, for each sampling time, M linear inequalities expressed by the above expression (13-m), as linear inequalities expressing the ZMP existence permissible region condition, by using the value of that time t as well as set values of the constant values Cx_m, Cy_m, and d_m which express the expressions of the respective sides of the supporting polygon set for that time.

Further, in the aforesaid section 3 (period of the one-leg supporting period after the landing of the foot 18 on the first step), the desired ZMP trajectory generating unit 52 sets, for each sampling time, M linear inequalities expressed by the above expression (14-m), as linear inequalities expressing the ZMP existence permissible region condition, by using the value of that time t as well as set values of the constant values Cx_m, Cy_m, and d_m which express the expressions of the respective sides of the supporting polygon set for that time.

It should be noted that in the present embodiment, the supporting polygon in a one-leg supporting period is a tetragon and the supporting polygon in a two-leg supporting period is a hexagon. However, a polygon having a different number of corners may be used as one or both of the supporting polygons in the one-leg and two-leg supporting periods.

Next, the trajectory connection condition is, in the present embodiment, more specifically a condition that the desired ZMP trajectory in a section i−1 (i=1, 2, . . . , e) and the desired ZMP trajectory in a section i are connected smoothly. Such a trajectory connection condition may be expressed as a condition that a position of the desired ZMP, on the desired ZMP trajectory in the section i−1, at the ending time (time t_i) of the section i−1 and a differential value of a prescribed order of that position of the desired ZMP agree with a position of the desired ZMP, on the desired ZMP trajectory in the section i, at the starting time (time t_i) of the section i and a differential value of the prescribed order of that position of the desired ZMP, respectively.

In the present embodiment, the differential value of a prescribed order described above includes, by way of example, two values of: a moving velocity of the ZMP (first order differential value of the position of the desired ZMP); and a moving acceleration thereof (second order differential value of the position of the desired ZMP).

In this case, the trajectory connection conditions about the position, moving velocity, and moving acceleration of the desired ZMP at respective boundaries between a preceding section i−1 and a succeeding section i (i=1, 2, . . . , e) adjacent to each other are expressed by the following expressions (15a), (15b), and (15c), respectively.

$$\sum_{j=0}^{n} \binom{Wx\_i-1, j}{Wy\_i-1, j} \cdot (tc\_i-1(t\_i))^j = \sum_{j=0}^{n} \binom{Wx\_i, j}{Wy\_i, j} \cdot (tc\_i(t\_i))^j \quad (15a)$$

$$\frac{1}{T\_i-1} \cdot \sum_{j=1}^{n} \binom{Wx\_i-1, j}{Wy\_i-1, j} \cdot j \cdot (tc\_i-1(t\_i))^{j-1} =$$
$$\frac{1}{T\_i} \cdot \sum_{j=1}^{n} \binom{Wx\_i, j}{Wy\_i, j} \cdot j \cdot (tc\_i(t\_i))^{j-1} \quad (15b)$$

$$\frac{1}{(T\_i-1)^2} \cdot \sum_{j=2}^{n} \binom{Wx\_i-1, j}{Wy\_i-1, j} \cdot j \cdot (j-1) \cdot (tc\_i-1(t\_i))^{j-2} =$$
$$\frac{1}{(T\_i)^2} \cdot \sum_{j=2}^{n} \binom{Wx\_i, j}{Wy\_i, j} \cdot j \cdot (j-1) \cdot (tc\_i(t\_i))^{j-2} \quad (15c)$$

Further, taking into consideration that the normalized time tc_i−1(t_i) corresponding to the ending time ti of the section i−1 equals 1 and that the normalized time tc_i(t_i) corresponding to the starting time ti of the section i equals 0, the expressions (15a) to (15c) are rewritten as the following expressions (16a) to (16c), respectively.

$$\sum_{j=0}^{n} \binom{Wx\_i-1, j}{Wy\_i-1, j} - \binom{Wx\_i, 0}{Wy\_i, 0} = \binom{0}{0} \quad (16a)$$

$$\frac{1}{T\_i-1} \cdot \sum_{j=1}^{n} \binom{Wx\_i-1, j}{Wy\_i-1, j} \cdot j - \frac{1}{T\_i} \cdot \binom{Wx\_i, 1}{Wy\_i, 1} = \binom{0}{0} \quad (16b)$$

$$\frac{1}{(T\_i-1)^2} \cdot \sum_{j=2}^{n} \binom{Wx\_i-1, j}{Wy\_i-1, j} \cdot j \cdot (j-1) -$$
$$\frac{2}{(T\_i)^2} \cdot \binom{Wx\_i, 2}{Wy\_i, 2} = \binom{0}{0} \quad (16c)$$

Thus, the desired ZMP trajectory generating unit 52 sets the above expressions (16a), (16b), and (16c) as linear equalities expressing the trajectory connection condition, for the respective boundaries between a section i−1 and a section i (i=1, 2, . . . , e), by using a set value of predetermined time width T_i (i=0, 1 . . . , e) of each section i.

It should be noted that the differential values of prescribed orders of the position of the ZMP used as the elements of the trajectory connection condition are not limited to both of the moving velocity and moving acceleration of the ZMP. For example, the moving acceleration may be excluded from the elements of the trajectory connection condition, or a third order differential value of the position of the ZMP may be used as an element of the trajectory connection condition.

Next, the geometric condition is a condition that is determined by the operating limits of the joints of the leg link mechanisms 3, such as stretching to the limit of a knee joint mechanism 15 of a leg link mechanism 3 or the torque limit of a joint actuator 40 of the robot 1. In the present embodiment, the geometric condition is approximated as a condition that restricts the region (hereinafter, referred to as "landing permissible region") where the foot 18 of a free leg is permitted to land.

In the present embodiment, the landing permissible region is, for example, a triangular region as shown in FIG. 8. The position (in the global coordinate system) of the landing permissible region is set to have a prescribed positional relationship with the foot 18 (in FIG. 8, foot 18R) of the supporting leg.

In this case, each side (of the three sides) of the landing permissible region is expressed by the following expression (17-r) (r=1, 2, 3) similar in form to the above expression (10).

$$C1x\_r \cdot x + C1y\_r \cdot y = d1\_r \quad (17\text{-r})$$

where r=1,2,3

Accordingly, the condition that the landing position is included in the landing permissible region is expressed by the following three linear inequalities (18-r) (r=1, 2, 3).

$$C1x\_r \cdot (Pftx(k) + \Delta Pftx(k)) + C1y\_r \cdot (Pfty(k) + \Delta Pfty(k)) < d1\_r \quad (18\text{-r})$$

where r=1,2,3

Pftx(k): position in X-axis direction of uncorrected (reference) desired landing position (on the k-th step)

Pfty(k): position in Y-axis direction of the uncorrected (reference) desired landing position (on the k-th step)

From the above expression (2c), $\Delta Pftx(k) = Wftxp(k) - Wftxn(k)$, and $\Delta Pfty(k) = Wftyp(k) - Wftyn(k)$, so the expression (18-r) is rewritten into the following expression (18-r)'.

$$C1x\_r \cdot (Wftxp(k) - Wftxn(k)) + C1y\_r \cdot (Wftyp(k) - Wftyn(k))$$
$$< d1\_r - C1x\_r \cdot Pftx(k) - C1y\_r \cdot Pfty(k) \quad (18\text{-r})'$$

The expression (18-r)' is a linear inequality regarding the landing position correction variables Wftxp(k), Wftxn(k), Wftyp(k), and Wftyn(k). Therefore, in the present embodiment, in each section i (section 1, 3) of the one-leg supporting period in the trajectory generation object period, the desired ZMP trajectory generating unit 52 sets the inequality expressed by the above expression (18-r)' as the linear inequality expressing the geometric condition.

More specifically, in each section 1, 3 of the one-leg supporting period, the desired ZMP trajectory generating unit 52 sets three linear inequalities expressed by the above expression (18-r)', as linear inequalities expressing the geometric condition, by using the set values of the constant values C1x_r, C1y_r, d1_r (r=1, 2, 3), representing the expressions of the respective sides of the landing permissible region set for the one-leg supporting period, as well as the reference desired landing position, set by the landing goal setting unit 51 for the one-leg supporting period.

It should be noted that while the landing permissible region is of a triangular shape in the present embodiment, it may be of another polygonal shape.

A description will now be made about an evaluation function (cost function) regarding the ZMP trajectory variables Wx_i,j, Wy_i,j and the landing position correction variables Wftxp(k), Wftxn(k), Wftyp(k), and Wftyn(k).

In the present embodiment, an evaluation function (cost function) for determining a group of variables composed of the ZMP trajectory variables Wx_i,j, Wy_i,j and the landing position correction variables Wftxp(k), Wftxn(k), Wftyp(k), and Wftyn(k) (k=1 in the present embodiment) by an algorithm of a solution method for a quadratic programming problem is set such that, by determining the group of variables so as to minimize the value of the evaluation function, an abrupt change of the desired ZMP can be avoided as much as possible and the magnitude of the landing position correction amount $\uparrow\Delta Pft(k)$ can be made as small as possible.

To this end, in the present embodiment, a function having a function Fzmp, obtained by integrating a square value $(\uparrow Azmp)^2$ ($=\uparrow Azmp^T \cdot \uparrow Azmp$) of a changing acceleration $\uparrow Azmp$ ($=d^2\uparrow Pzmp/dt^2=[d^2Xzmp/dt^2, d^2Yzmp/dt^2]^T$) of a desired ZMP vector $\uparrow Pzmp=[Xzmp, Yzmp]^T$, and functions Fft2 and Fft1, representing L2 norm and L1 norm, respectively, of the landing position correction variables Wftxp(k), Wftxn(k), Wftyp(k), and Wftyn(k), combined together as shown in the following expression (19), is used as an evaluation function F.

$$F = Fzmp + Fft2 + Fft1 \quad (19)$$

The functions Fzmp, Fft2, and Fft1 are constructed as follows. Hereinafter, $\uparrow Azmp$ will be referred to as "ZMP acceleration", and its square value $(\uparrow Azmp)^2$ ($=\uparrow Azmp^T \cdot \uparrow Azmp$) will be referred to as "ZMP square acceleration".

Firstly, the function Fzmp concerning the ZMP trajectory variables Wx_i,j, Wy_i,j will be described. The ZMP acceleration $\uparrow Azmp\_i(t)$ ($=[Axzmp\_i(t), Ayzmp\_i(t)]^T$) at a given time t in each section i (i=0, 1, ..., e) of the trajectory generation object period is expressed, using the above expression (1), by the following expression (20).

$$\uparrow Azmp\_i(t) = \begin{pmatrix} Axzmp\_i(t) \\ Ayzmp\_i(t) \end{pmatrix} \quad (20)$$

$$= \frac{1}{(T\_i)^2} \cdot \sum_{j=2}^{n} \begin{pmatrix} Wx\_i, j \\ Wy\_i, j \end{pmatrix} \cdot j \cdot (j-1) \cdot (tc\_i(t))^{j-2}$$

$$= \begin{pmatrix} (\uparrow Wx\_i)^T \cdot \uparrow h(tc\_i(t)) \\ (\uparrow Wy\_i)^T \cdot \uparrow h(tc\_i(t)) \end{pmatrix}$$

where $$\uparrow Wx\_i = \begin{pmatrix} Wx\_i, 0 \\ Wx\_i, 1 \\ Wx\_i, 2 \\ \vdots \\ Wx\_i, n \end{pmatrix}$$

$$\uparrow Wy\_i = \begin{pmatrix} Wy\_i, 0 \\ Wy\_i, 1 \\ Wy\_i, 2 \\ \vdots \\ Wy\_i, n \end{pmatrix}$$

$$\uparrow h(tc\_i(t)) = \begin{pmatrix} 0 \\ 0 \\ h2(t) \\ \vdots \\ hn(t) \end{pmatrix}$$

$$hj(t) = \frac{1}{(T\_i)^2} \cdot j \cdot (j-1) \cdot (tc\_i(t))^{j-2} \quad (j = 2, 3, \ldots, n)$$

The square values $(Axzmp\_i(t))^2$, $(Ayzmp\_i(t))^2$ of the respective components $Axzmp\_i(t)$, $Ayzmp\_i(t)$ of the ZMP acceleration $\uparrow Azmp\_i(t)$ are expressed by the following expressions (21a) and (21b).

$$(Axzmp\_i(t))^2 = \uparrow Wx\_i^T \cdot \uparrow h(tc\_i(t)) \cdot h(tc\_i(t))^T \cdot \uparrow Wx\_i \quad (21a)$$
$$= \uparrow Wx\_i^T \cdot Hd\_m(tc\_i(t)) \cdot \uparrow Wx\_i$$

$$(Ayzmp\_i(t))^2 = \uparrow Wy\_i^T \cdot \uparrow h(tc\_i(t)) \cdot h(tc\_i(t))^T \cdot \uparrow Wy\_i \quad (21b)$$
$$= \uparrow Wy\_i^T \cdot Hd\_m(tc\_i(t)) \cdot \uparrow Wy\_i$$

where $Hd\_m(tc\_i(t)) = \uparrow h(tc\_i(t)) \cdot h(tc\_i(t))^T$ (: square matrix of order (n+1))

Therefore, the integrals (from time t_i to time t_i+1) of respective ones of the square values $(Axzmp\_i(t))^2$ and $(Ayzmp\_i(t))^2$ in a section i are expressed by the following expressions (22a) and (22b).

$$\int_{t\_i}^{t\_i+1} (Axzmp\_i(t))^2 dt = \int_0^1 ((Axzmp\_i(tc\_i))^2 \cdot T\_i) dtc\_i \quad (22a)$$

$$= T\_i \cdot \uparrow Wx\_i^T \cdot \left( \int_0^1 Hd\_m(tc\_i) dtc\_i \right) \cdot \uparrow Wx\_i$$

$$= T\_i \cdot \uparrow Wx\_i^T \cdot H\_m(T\_i) \cdot \uparrow Wx\_i$$

-continued $$\int_{t\_i}^{\tau\_i+1} (\text{Aymp\_i}(t))^2 dt = \int_0^1 ((\text{Aymp\_i}(tc\_i))^2 \cdot T\_i) dtc\_i \qquad (22b)$$
$$= T\_i \cdot \uparrow Wy\_i^T \cdot \left( \int_0^1 \text{Hd\_m}(tc\_i) dtc\_i \right) \cdot \uparrow Wy\_i$$
$$= T\_i \cdot \uparrow Wy\_i^T \cdot H\_m(T\_i) \cdot \uparrow Wy\_i$$

where $H\_m(T\_i) = \int_0^1 Hd\_m(tc\_i) dtc\_i$ (: square matrix of order $(n+1)$)

Here, as apparent from the proviso of the expression (20), that of the expressions (21a) and (21b), and that of the expressions (22a) and (22b), $H\_m(T\_i)$ is a matrix whose components each become zero or a constant value according to the time width $T\_i$ of the section i.

Further, the ZMP square acceleration $(\uparrow Azmp\_i(t))^2$ at a given time t is a total $(=(Axzmp\_i(t))^2+(Ayzmp\_i(t))^2)$ of the component $(Axzmp\_i(t))^2$ in the X-axis direction and the component $(Ayzmp\_i(t))^2$ in the Y-axis direction of the ZMP acceleration.

In the present embodiment, the integral (from time $t\_0$ to time $t\_e+1$) obtained by integrating the ZMP square acceleration $(\uparrow Azmp\_i(t))^2$ for the entire trajectory generation object period is used as the function Fzmp as the constituent element of the aforesaid evaluation function F.

In this case, the function Fzmp as the integral of the ZMP square acceleration $(\uparrow Azmp(t))^2$ is expressed by the following expression (23).

$$Fzmp = \int_{t\_0}^{\tau\_e+1} (\uparrow Azmp(t))^2 dt \qquad (23)$$
$$= \int_{t\_0}^{\tau\_e+1} ((Axzmp(t))^2 + (Ayzmp(t))^2) dt$$
$$= \sum_{i=0}^{e} T\_i \cdot \uparrow Wx\_i^T \cdot H\_m(T\_i) \cdot \uparrow Wx\_i +$$
$$\sum_{i=0}^{e} T\_i \cdot \uparrow Wy\_i^T \cdot H\_m(T\_i) \cdot \uparrow Wy\_i$$
$$= \uparrow W^T \cdot Hh\_m \cdot \uparrow W$$

where $$\uparrow W = \begin{pmatrix} \uparrow Wx\_0 \\ \uparrow Wx\_1 \\ \vdots \\ \uparrow Wx\_e \\ \uparrow Wy\_0 \\ \uparrow Wy\_1 \\ \vdots \\ \uparrow Wy\_e \end{pmatrix}$$

$$Hh\_m = \begin{pmatrix} Hs\_m & 0h \\ 0h & Hs\_m \end{pmatrix}$$

-continued $$Hs\_m = \begin{pmatrix} T\_0 \cdot H\_m(T\_0) & 0s & 0s & \cdots & 0s \\ 0s & T\_1 \cdot H\_m(T\_1) & 0s & \cdots & 0s \\ 0s & 0s & \ddots & & \vdots \\ \vdots & \vdots & & \ddots & 0s \\ 0s & 0s & \cdots & 0s & T\_e \cdot H\_m(T\_e) \end{pmatrix}$$

0h: zero matrix of order $(e+1)\cdot(n+1)$
0s: zero matrix of order $(n+1)$

It should be noted that $\uparrow W$ represents a vector composed of $2\cdot(e+1)\cdot(n+1)$ components, Hh_m represents a square matrix of order $2\cdot(e+1)\sim(n+1)$, and Hs_m represents a square matrix of order $(e+1)\cdot(n+1)$.

In this manner, the function Fzmp defined by the expression (23) becomes a quadratic function (about Wx_i,j, Wy_i,j) which includes, as variables, square values of $2\cdot(e+1)\cdot(n+1)$ ZMP trajectory variables Wx_i,j, Wy_i,j (i=0, 1, ..., e; j=0, 1, ..., n).

It should be noted that the value of each component of the matrix Hs_m in the function Fzmp is calculated using the set value of the time width T_i of each section i (i=0, 1, ..., e) of the trajectory generation object period.

The functions Fft2 and Fft1 concerning the landing position correction variables Wftxp(k), Wftxn(k), Wftyp(k), and Wftyn(k) are set by the following expressions (24) and (25), respectively.

$$Fft2 = \mu \cdot \uparrow Wft(k)^T \cdot Wft(k) \qquad (24)$$
$$= \mu \cdot (Wftxp(k)^2 + Wftxn(k)^2 + Wftyp(k)^2 + Wftyn(k)^2)$$

$$Fft1 = \varepsilon \cdot \uparrow 1^T \cdot Wft(k) \qquad (25)$$
$$= \varepsilon \cdot (Wftxp(k) + Wftxn(k) + Wftyp(k) + Wftyn(k))$$

It should be noted that $\mu$ and $\varepsilon$ above are prescribed constant values, and $\uparrow 1$ is a constant vector with all the elements being "1".

The function Fft2 set by the above expression (24) is a function expressing the L2 norm of the the landing position correction variables Wftxp(k), Wftxn(k), Wftyp(k), and Wftyn(k). The function Fft1 set by the above expression (25) is a function expressing the L1 norm of the landing position correction variables Wftxp(k), Wftxn(k), Wftyp(k), and Wftyn(k).

In the above-described manner, the desired ZMP trajectory generating unit 52 sets the linear equalities that express the divergence component condition (stabilization condition), the via point condition, and the trajectory connection condition, the linear inequalities that express the ZMP existence permissible region condition and the geometric condition, and the evaluation function F (=Fzmp+Fft2+Fft1).

The desired ZMP trajectory generating unit 52 then uses the evaluation function F and the linear equalities and linear inequalities described above to carry out the processing in the desired variable value determining unit 52a, to thereby determine the desired variable group composed of the desired values of the ZMP trajectory variables Wx_i,j, Wy_i,j (i=0, 1, ..., e; j=0, 1, ..., n) as the coefficients of the polynomial function expressing the trajectory of the desired ZMP vector and the desired values of the landing position correction variables Wftxp(k), Wftxn(k), Wftyp(k), and Wftyn(k) defining the landing position correction amount ↑ΔPft(k) (k=1 in the present embodiment).

In this case, the desired variable value determining unit 52a uses the linear equalities and linear inequalities described above as the constraint conditions regarding the values of the ZMP trajectory variables Wx_i,j, Wy_i,j and the landing position correction variables Wftxp(k), Wftxn (k), Wftyp(k), and Wftyn(k) to carry out the processing of determining the desired variable group, by a known algorithm of a solution method for a quadratic programming problem, in such a way as to minimize the value of the evaluation function F. For this algorithm, an interior point method or an active set method, for example, can be used.

Accordingly, the polynomial functions that express, as a function of time, the trajectories of the desired ZMP vector ↑Pzmp (trajectories of the position Xzmp in the X-axis direction and the position Yzmp in the Y-axis direction of the desired ZMP) in the respective ones of all the sections i (i=0, 1, ..., e) in the trajectory generation object period are determined, and the landing position correction amount ↑ΔPft(k) (the landing position correction amount ↑ΔPft(1) for the first step) is also determined.

The above has described the details of the processing performed by the desired ZMP trajectory generating unit 52 in the present embodiment.

According to the present embodiment described above, with a desired ZMP trajectory being expressed by a polynomial function, the above-described stabilization condition, via point condition, and ZMP existence permissible region condition out of the constraint conditions regarding the desired ZMP trajectory can be expressed by linear equalities or linear inequalities about the ZMP trajectory variables Wx_i,j, Wy_i,j (i=0, 1, ..., e; j=0, 1, ..., n) as the coefficients of the polynomial function and the landing position correction variables Wftxp(k), Wftxn(k), Wftyp(k), and Wftyn(k). The trajectory connection condition can be expressed by a linear equality about the ZMP trajectory variables Wx_i,j, Wy_i,j (i=0, 1, ..., e; j=0, 1, ..., n). The geometric condition can be expressed by a linear inequality about the landing position correction variables Wftxp(k), Wftxn(k), Wftyp(k), and Wftyn(k).

The evaluation function F (cost function) is set as a function of a total of the function Fzmp, obtained by integrating a square value (↑Azmp)$^2$ of a changing acceleration ↑Azmp of a desired ZMP vector ↑Pzmp, and the functions Fft2 and Fft1, representing the L2 norm and L1 norm, respectively, of the landing position correction variables Wftxp(k), Wftxn(k), Wftyp(k), and Wftyn(k).

It is therefore possible to collectively determine the desired values of the ZMP trajectory variables Wx_i,j, Wy_i,j and the landing position correction variables Wftxp (k), Wftxn(k), Wftyp(k), and Wftyn(k), by an algorithm of a solution method for a quadratic programming problem, in such a way as to minimize the value of the evaluation function F while fulfilling the constraint conditions expressed by the linear equalities and linear inequalities. Consequently, generating a desired ZMP trajectory that may fulfill all the constraint conditions and determining the landing position correction variables Wftxp(k), Wftxn(k), Wftyp(k), and Wftyn(k) (and, hence, determining the landing position correction amount ↑ΔPft(k)) can be performed collectively and efficiently.

Further, with the evaluation function F (cost function) being set as described above, a desired ZMP trajectory which is smooth and unlikely to make an abrupt change of the desired ZMP can be generated, and the landing position correction amount ↑ΔPft(k) can be made as small as possible. In particular, as the evaluation function F includes the function Fft1 that expresses the L1 cost regarding the landing position correction amount ↑ΔPft(k), the effect of maintaining the landing position correction amount ↑ΔPft(k) at zero or a value close to zero as much as possible can be enhanced. Consequently, a desired gait that enables smooth movement operation of the robot 1 can be generated.

An example of the desired ZMP trajectory generated along with correction of the desired landing position by the present embodiment will now be described with reference to FIG. 9.

In FIG. 9, the first graph (on the top) indicates external force applied to the robot 1, the second graph indicates correction amounts of desired landing positions of the right and left feet 18R and 18L from their reference desired landing positions, and the third graph (at the bottom) indicates a change amount of the desired ZMP (amount of displacement from the desired ZMP trajectory at the time of steady normal walking of the robot 1).

At time ta, external force is applied to the robot 1. Thus, in the period Tp, the desired landing position of the right foot 18R is displaced from the reference desired landing position. Correspondingly, in the period Tq, the desired ZMP trajectory is generated as a trajectory that is displaced from the desired ZMP trajectory at the time of the steady normal walking.

In this manner, according to the present embodiment, it is possible to generate a desired ZMP trajectory while correcting the desired landing position.

It should be noted that the present invention is not limited to the embodiment described above; other embodiments may be adopted as well. Several modifications will be described below.

In the above embodiment, the desired landing position is corrected only for the first step. Alternatively, the desired landing position may be corrected, not only for the first step, but also for the second step.

Further, in the above embodiment, the description was made by way of example about the case where the robot 1 travels in a biped gait. The present invention, however, is also applicable in the case where the robot 1 travels in a quadruped gait by using the hands 30R, 30L of the arm link mechanisms 4R, 4L of the robot 1 as the moving/landing portions, in addition to the feet 18R, 18L of the leg link mechanisms 3R, 3L.

Further, the legged mobile robot in the present invention is not limited to a robot 1 having two leg link mechanisms 3R and 3L; it may be a robot having three or more leg link mechanisms.

Further, in the above embodiment, the stabilization condition, via point condition, trajectory connection condition, ZMP existence permissible region condition, and geometric condition are used as the constraint conditions regarding the desired ZMP trajectory. However, some of the conditions may be omitted, or one or more constraint conditions may further be added.

For example, the via point condition may be omitted. Further, the trajectory connection condition will be unnecessary if the trajectory generation object period is not divided into a plurality of sections i.

Further, in the above embodiment, a function expressing an integral of the ZMP square acceleration is used as the function Fzmp concerning the ZMP trajectory variables Wx_i,j, Wy_i,j, as the constituent element of the evaluation function F. However, another function expressing an integral of a moving velocity of the desired ZMP, for example, may also be used as the function Fzmp. Further, one of the functions Fft1 and Fft2 as the constituent elements of the evaluation function F may be omitted.

What is claimed is:

1. A device for generating a desired ZMP trajectory as a trajectory of a desired position of a zero moment point (ZMP) of a legged mobile robot, the device comprising:
a landing goal setting unit which sets a reference desired landing position and a reference desired landing posture of each leg at a time of movement of the legged mobile robot in a trajectory generation object period for which a desired ZMP trajectory is to be generated; and
a desired variable value determining unit which determines desired values for a plurality of unknown variables, the unknown variables comprising coefficients in respective terms of a polynomial function of degree 2 or higher configured to express the desired ZMP trajectory in the trajectory generation object period as a function of time, and a landing position correction amount as a correction amount for correcting at least one desired landing position in the trajectory generation object period from the reference desired landing position, or a parameter having a certain relationship with the landing position correction amount; wherein
the desired variable value determining unit is configured to use an evaluation function, having the coefficients in the respective terms of the polynomial function and the landing position correction amount or the parameter as unknown variables, and a plurality of constraint conditions each configured by a linear equality or linear inequality regarding the coefficients in the respective terms of the polynomial function and the landing position correction amount, to determine desired values of the unknown variables, by a solution method for a quadratic programming problem, in such a way as to minimize a value of the evaluation function while fulfilling the constraint conditions.

2. The desired ZMP trajectory generating device according to claim 1, wherein the constraint conditions include a linear inequality which expresses a first constraint condition that a desired position of the ZMP at at least one sampling time in the trajectory generation object period exists within a region of a supporting polygon which is obtained by displacing a reference supporting polygon, determined based on the reference desired landing position and the reference desired landing posture in the trajectory generation object period, by a displacement amount defined in accordance with the landing position correction amount or the parameter.

3. The desired ZMP trajectory generating device according to claim 2, wherein
the legged mobile robot is a robot that has two legs and travels in such a manner that a two-leg supporting period in which the two legs are in contact with a floor and a one-leg supporting period in which only one of the two legs is in contact with the floor are alternated repeatedly,
the sampling time includes a time in the two-leg supporting period included in the trajectory generation object period, and
the desired variable value determining unit is configured to set a reference supporting polygon, determined based on a desired landing position and a desired landing posture of a first leg that is in contact with the floor in the one-leg supporting period immediately before the two-leg supporting period and the reference desired landing position and the reference desired landing posture of a second leg that lands on the floor at an end of the immediately preceding one-leg supporting period, as a supporting polygon at a start of the two-leg supporting period, to set a supporting polygon obtained by translating the reference supporting polygon by a landing position correction amount of the second leg, as a supporting polygon at an end of the two-leg supporting period, and to set a supporting polygon corresponding to the desired ZMP at the sampling time in the two-leg supporting period, as a supporting polygon obtained by translating the reference supporting polygon at the start of the two-leg supporting period by a displacement amount obtained by dividing the landing position correction amount of the second leg in accordance with a ratio of a time difference between the start of the two-leg supporting period and the sampling time with respect to a time width of the two-leg supporting period.

4. The desired ZMP trajectory generating device according to claim 1, wherein
the constraint conditions include a linear equality which expresses a second constraint condition that is a condition for keeping in a stable state an inverted pendulum mass point in a model that expresses a motion of a center of gravity of the legged mobile robot by a motion of the inverted pendulum mass point having a mass point at the center of gravity of the robot and having a ZMP on the desired ZMP trajectory as a fulcrum, the second constraint condition being a condition that a motional state of the inverted pendulum mass point at a prescribed time in the trajectory generation object period agrees with a prescribed motional state, and
the motional state of the inverted pendulum mass point at the prescribed time is a motional state which is expressed as a total of a component defined in accordance with the reference desired landing position and the reference desired landing posture prior to the prescribed time and a component defined in accordance with the landing position correction amount or the parameter regarding the reference desired landing position prior to the prescribed time.

5. The desired ZMP trajectory generating device according to claim 1, wherein
the constraint conditions include a linear equality which expresses a third constraint condition that a desired position of the ZMP at a prescribed time in the trajectory generation object period agrees with a prescribed position within a floor-contacting surface of a leg that is in contact with the floor at the prescribed time, and
the prescribed position is a position which is set as a position displaced from a position determined in accordance with the reference desired landing position and the reference desired landing posture of the leg that is in contact with the floor at the prescribed time by the landing position correction amount with respect to the reference desired landing position.

6. The desired ZMP trajectory generating device according to claim 1, wherein the evaluation function is an evaluation function which is set as a function summing up a function expressing an integral of a square value of a moving acceleration of the ZMP in the desired ZMP trajectory using the coefficients in the respective terms of the polynomial function, a function expressing an L2 norm of the landing position correction amount using the landing position correction amount or the parameter, and a function expressing an L1 norm of the landing position correction amount using the landing position correction amount or the parameter.

* * * * *